(12) United States Patent
Su et al.

(10) Patent No.: US 11,836,383 B2
(45) Date of Patent: Dec. 5, 2023

(54) CONTROLLERS OF STORAGE DEVICES FOR ARRANGING ORDER OF COMMANDS AND METHODS OF OPERATING THE SAME

(71) Applicant: SILICON MOTION INC., Zhubei (TW)

(72) Inventors: Che Jen Su, Zhubei (TW); Bao Ren Guo, Zhubei (TW)

(73) Assignee: SILICON MOTION INC., Zhubei (TW)

( * ) Notice: Subject to any disclaimer, the term of this patent is extended or adjusted under 35 U.S.C. 154(b) by 120 days.

(21) Appl. No.: 17/534,275

(22) Filed: Nov. 23, 2021

(65) Prior Publication Data

US 2023/0161501 A1 May 25, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0653* (2013.01); *G06F 3/0679* (2013.01)

(58) Field of Classification Search
CPC .... G06F 3/0659; G06F 3/0604; G06F 3/0679; G06F 3/0655; G06F 3/0656; G06F 3/0658
See application file for complete search history.

(56) References Cited

U.S. PATENT DOCUMENTS

| | | | |
|---|---|---|---|
| 6,490,635 B1 | 12/2002 | Holmes | |
| 2004/0068614 A1* | 4/2004 | Rosenbluth | G06F 13/1642 711/133 |
| 2012/0159016 A1* | 6/2012 | Morita | G06F 13/1673 710/33 |
| 2015/0186068 A1* | 7/2015 | Benisty | G06F 3/0673 711/154 |
| 2017/0075570 A1* | 3/2017 | Yoon | G06F 3/0679 |
| 2018/0039578 A1 | 2/2018 | Yun | |
| 2018/0293006 A1 | 10/2018 | Jeong | |
| 2020/0057582 A1* | 2/2020 | Shin | G06F 3/0656 |
| 2021/0382654 A1* | 12/2021 | Kang | G06F 9/542 |
| 2022/0317934 A1* | 10/2022 | Shen | G06F 13/161 |

FOREIGN PATENT DOCUMENTS

WO 2017131724 A1 8/2017

\* cited by examiner

*Primary Examiner* — Tracy A Warren
(74) *Attorney, Agent, or Firm* — Duane Morris LLP

(57) ABSTRACT

The present invention provides a storage device including a controller and methods for operating the storage device and the controller. A controller of a storage device may comprise: an interface controller; a memory controller; a processor configured to transmit downstream commands and upstream commands to the memory controller. The memory controller may be coupled between the interface controller and the processor and may comprise: a first command queue; a second command queue; and a tag generator. The memory controller may be configured to: store a first command received from the processor in the first command queue; store a second command received from the processor in the second command queue; and in response to a first access region of the first command overlapping a second access region of the second command in the second queue, assign an order tag to the second command based on a first serial number of the first command by the tag generator.

19 Claims, 17 Drawing Sheets

Upstream Command Information Array 510

| HMB Address 511 (byte) | HMB Size 512 (bytes) | Serial Number 513 | Order Tag 514 |
|---|---|---|---|
| 0xA000 | 0x300 | 0x01 | 0x20 — 531 |
| 0xC000 | 0x300 | 0x02 | 0x20 — 532 |
| 0xB000 | 0x300 | 0x03 | 0x20 — 533 |
| 0xC000 | 0x300 | 0x04 | 0x20 — 534 |

Downstream Command Information Array 520

| HMB Address 521 (byte) | HMB Size 522 (bytes) | Serial Number 523 | Order Tag 524 |
|---|---|---|---|

Fireware Queue 310

| 311 | 312 | 313 | 314 | 315 | 316 | 317 | 318 | 319 |
|---|---|---|---|---|---|---|---|---|
| Up | Up | Up | Up | Dn | Up | Up | Dn | Up |

FIG. 5A

Upstream Command Information Array 510

| HMB Address 511 (byte) | HMB Size 512 (bytes) | Serial Number 513 | Order Tag 514 |
|---|---|---|---|
| 0xA000 | 0x300 | 0x01 | 0x20 | ← 531
| 0xC000 | 0x300 | 0x02 | 0x20 | ← 532
| 0xB000 | 0x300 | 0x03 | 0x20 | ← 533
| 0xC000 | 0x300 | 0x04 | 0x20 | ← 534
| 0xD000 | 0x300 | 0x05 | 0x20 | ← 536
| 0xE000 | 0x300 | 0x06 | 0x20 | ← 537
| 0xF000 | 0x300 | 0x07 | 0x20 | ← 539

Downstream Command Information Array 520

| HMB Address 521 (byte) | HMB Size 522 (bytes) | Serial Number 523 | Order Tag 524 |
|---|---|---|---|
| 0xB800 | 0x800 | 0x01 | 0x04 | ← 535
| 0x9800 | 0x800 | 0x02 | 0x01 | ← 538

Fireware Queue 310

| 319 | 318 | 317 | 316 | 315 | 314 | 313 | 312 | 311 |
|---|---|---|---|---|---|---|---|---|
| Up | Dn | Up | Up | Dn | Up | Up | Up | Up |

FIG. 5F

Upstream Command Information Array 510

| HMB Address 511 (byte) | HMB Size 512 (bytes) | Serial Number 513 | Order Tag 514 |
|---|---|---|---|
| 0xC000 | 0x300 | 0x02 | 0x20 |
| 0xB000 | 0x300 | 0x03 | 0x20 |
| 0xC000 | 0x300 | 0x04 | 0x20 |
| 0xD000 | 0x300 | 0x05 | 0x20 |
| 0xE000 | 0x300 | 0x06 | 0x20 |
| 0xF000 | 0x300 | 0x07 | 0x20 |

Downstream Command Information Array 520

| HMB Address 521 (byte) | HMB Size 522 (bytes) | Serial Number 523 | Order Tag 524 |
|---|---|---|---|
| 0xB800 | 0x800 | 0x01 | 0x04 |
| 0x9800 | 0x800 | 0x02 | 0x01 |

FIG. 6A

| Upstream Command Information Array 510 | | | |
|---|---|---|---|
| HMB Address 511 (byte) | HMB Size 512 (bytes) | Serial Number 513 | Order Tag 514 |
| 0xD000 | 0x300 | 0x05 | 0x20 ← 536 |
| 0xE000 | 0x300 | 0x06 | 0x20 ← 537 |
| 0xF000 | 0x300 | 0x07 | 0x20 ← 539 |

| Downstream Command Information Array 520 | | | |
|---|---|---|---|
| HMB Address 521 (byte) | HMB Size 522 (bytes) | Serial Number 523 | Order Tag 524 |
| 0xB800 | 0x800 | 0x01 | 0x04 ← 535 |
| 0x9800 | 0x800 | 0x02 | 0x01 ← 538 |

FIG. 6B

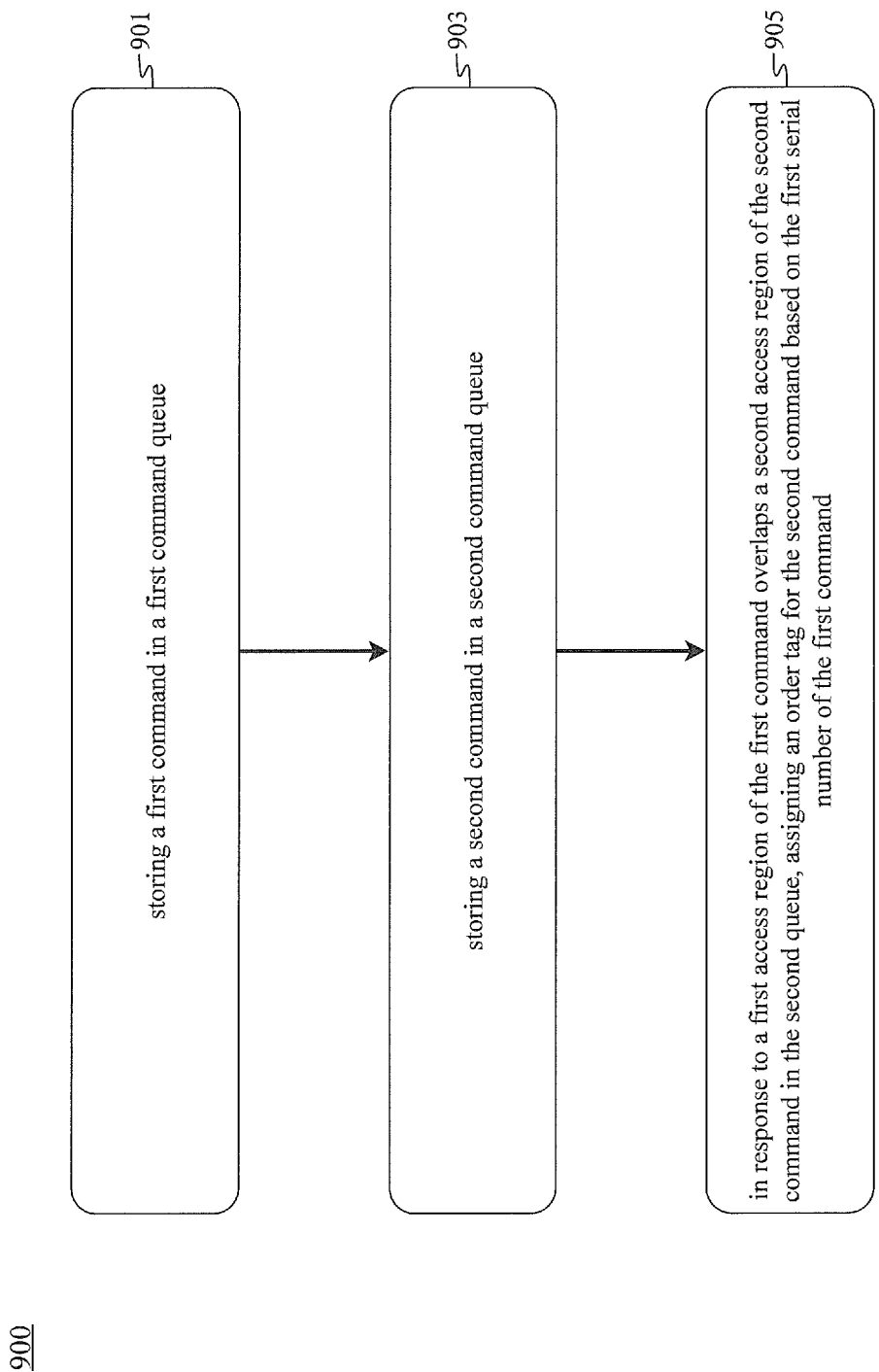

CONTROLLERS OF STORAGE DEVICES FOR ARRANGING ORDER OF COMMANDS AND METHODS OF OPERATING THE SAME

BACKGROUND OF THE INVENTION

1. Field of the Invention

The present disclosure relates to data storage devices, and more particularly, to a data storage device using a host memory and a method of operating same.

2. Description of the Prior Art

A host may use a data storage device including nonvolatile memory, such as flash memory. The host may share a portion of its main memory (e.g., dynamic random access memory (DRAM)) with the data storage device. The host may allocate a portion of its main memory for the data storage device to be used as a data buffer. The data buffer allocated from the host's memory is called a Host Memory Buffer.

SUMMARY OF THE INVENTION

Data blocks or data commands are transmitted or performed in different command queues between the data storage device and the host. Some queues are half-duplex, and some queues are full duplex. Data blocks or data commands transmitted or performed in the half-duplex and full-duplex queues may cause data blocks or data commands to be transmitted or performed in a disorderly manner. Hence, the present disclosure provides novel data storage devices and novel methods of operating the same.

An embodiment of the present disclosure provides a controller of a storage device. The controller may comprise: an interface controller; a memory controller; a processor configured to transmit downstream commands and upstream commands to the memory controller. The memory controller may be coupled between the interface controller and the processor and may comprise: a first command queue; a second command queue; and a tag generator. The memory controller may be configured to: store a first command received from the processor in the first command queue; store a second command received from the processor in the second command queue; and in response to a first access region of the first command overlapping a second access region of the second command in the second queue, assign an order tag to the second command based on a first serial number of the first command by the tag generator. The first command may be associated with the first serial number. The first serial number may indicate order of first information associated with the first command to be transmitted to the interface controller. The second command may be associated with a second serial number. The second serial number may indicate order of second information associated with the second command to be transmitted to the interface controller.

Another embodiment of the present disclosure provides a storage device including a controller. The controller may comprise: an interface controller; a memory controller; a processor configured to transmit downstream commands and upstream commands to the memory controller. The memory controller may be coupled between the interface controller and the processor and may comprise: a first command queue; a second command queue; and a tag generator. The memory controller may be configured to: store a first command received from the processor in the first command queue; store a second command received from the processor in the second command queue; and in response to a first access region of the first command overlapping a second access region of the second command in the second queue, assign an order tag to the second command based on a first serial number of the first command by the tag generator. The first command may be associated with the first serial number. The first serial number may indicate order of first information associated with the first command to be transmitted to the interface controller. The second command may be associated with a second serial number. The second serial number may indicate order of second information associated with the second command to be transmitted to the interface controller.

Another embodiment of the present disclosure provides a method performed by a storage device for accessing a memory of a host. The method may comprise storing a first command in the first command queue; storing a second command in the second command queue; in response to a first access region of the first command overlapping a second access region of the second command in the second queue, assigning an order tag to the second command based on a first serial number of the first command. The first command may be associated with the first serial number. The first serial number may indicate order of first information associated with the first command to be transmitted to the host. The second command may be associated with a second serial number. The second serial number may indicate order of second information associated with the second command to be transmitted to the host. The first access region and the second access region may relate to areas in the memory of the host.

BRIEF DESCRIPTION OF THE DRAWINGS

FIGS. 5A-5F are schematic diagrams illustrating queues and information arrays of a computer system in accordance with some embodiments of the present disclosure.

FIGS. 6A-6C are schematic diagrams illustrating information arrays of a computer system in accordance with some embodiments of the present disclosure.

FIG. 9 is a flow chart illustrating a method of operating a data storage device in accordance with some embodiments of the present disclosure.

DETAILED DESCRIPTION

Embodiments of the present disclosure will be described in some additional detail with reference to the accompanying drawings. The present disclosure may, however, be embodied in many different forms and should not be construed as being limited to only the illustrated embodiments. Rather, these embodiments are provided so that this disclosure will be thorough and complete and will fully convey the scope of the inventive concept to those skilled in the art. Throughout the written description and drawings, like reference numbers and labels are used to denote like or similar elements, features, and/or method steps.

Figure 1:
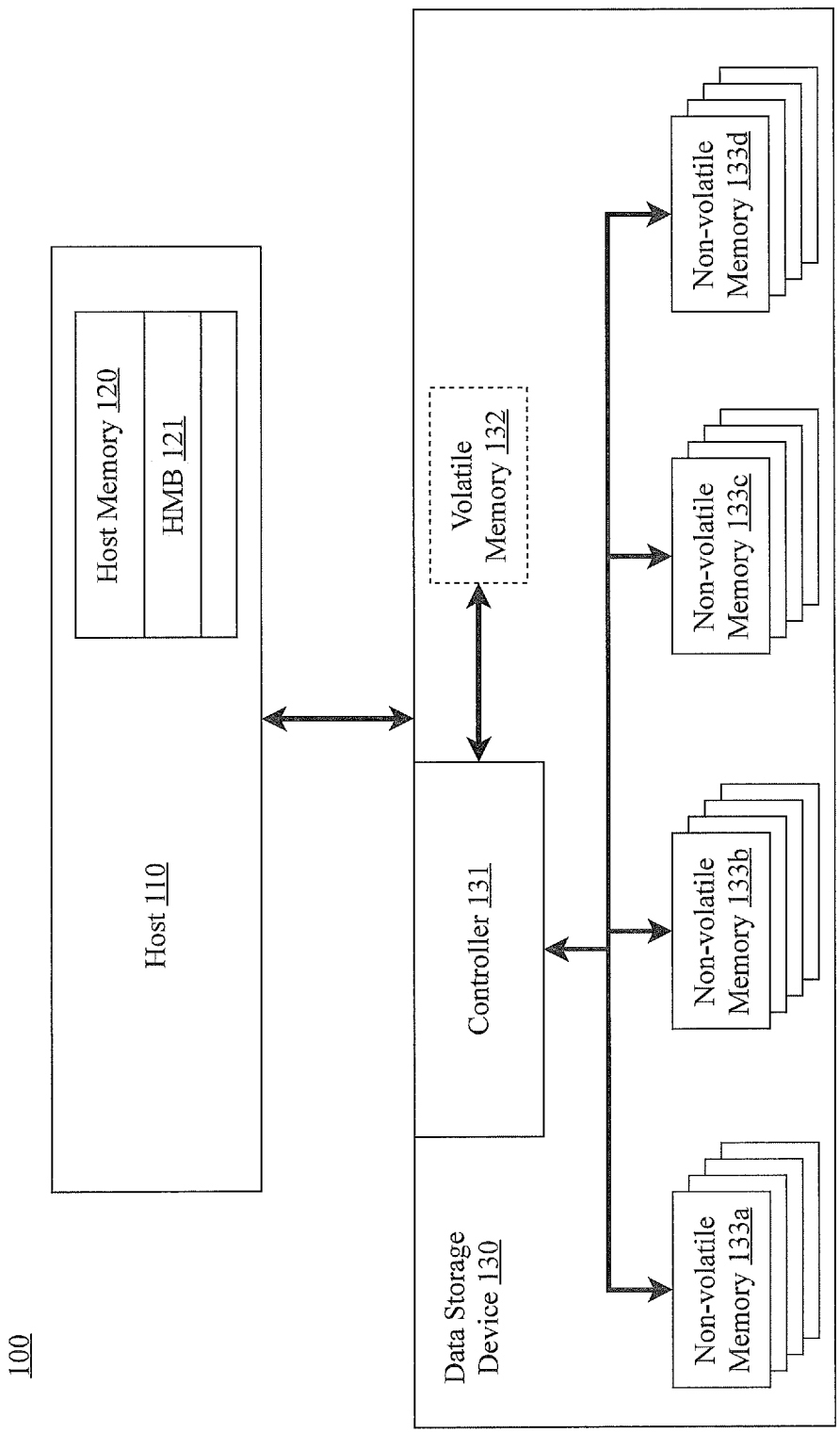
FIG. 1 is a block diagram illustrating a computer system including a data storage device in accordance with some embodiments of the present disclosure.

FIG. 1 is a block diagram illustrating a computer system including a data storage device in accordance with some embodiments of the present disclosure. Referring to FIG. 1, a computer system 100 may include a host 110, a host memory 120, and a data storage device 130.

The host 110 may drive constituent elements using, for example, an operating system (OS) included in the computer system 100. The host 110 may include controllers that control constituent elements included in the computer system 100, such as various interface(s), display(s), and related computational engine(s). The host 110 may take many different forms, such as a central processing unit (CPU), a graphic processing unit (GPU), a system on chip (SoC), and an application processor (AP).

The host memory 120 may perform various data input/output (I/O) operation(s) under the control of the host 110. The host memory 120 may operate as a main memory, an operational memory, a buffer memory, and/or a cache memory. The host memory 120 may include volatile memory, such as a DRAM, a SRAM, etc. Referring to FIG. 1, the host memory 120 may include a host memory buffer (HBM) 121.

The data storage device 130 may perform various data I/O operation(s) in response to the host 110. Referring to FIG. 1, the data storage device 130 may include a controller 131 and a plurality of non-volatile memories 133a to 133d. The data storage device 130 may include a volatile memory 132. However, in some embodiments, the data storage device 130 need not include a volatile memory 132.

The non-volatile memories 133a to 133d may be at least one of various types of memory, such as NAND flash memory, NOR flash memory, ferroelectric RAM (FRAM), phase-change RAM (PRAM), thyristor RAM (TRAM), magnetic RAM (MRAM), etc. One or more types of non-volatile memories 133a to 133d may be provided by the data storage device 130 in accordance with the design. In some embodiments, the non-volatile memories 133a to 133d may be NAND flash memories.

The controller 131 may be used to control the execution of data I/O operations with respect to the non-volatile memories 133a to 133d in response to host 110. The controller 131 may be used to convert logical address(es) received from the host 110 into corresponding physical address(es) with reference to a mapping table. Thereafter, the controller 131 may store data in the non-volatile memories 133a to 133d or read data from the non-volatile memories 133a to 133d with reference to the physical address(es).

An interface between the data storage device 130 and the host 110 may be configured to implement one or more data communication protocol(s) or specification(s). For example, the interface between the data storage device 130 and the host 110 may support communication using at least one of the standards associated with the Universal Serial Bus (USB), Advanced Technology Attachment (ATA), serial ATA (SATA), Small Computer Small Interface (SCSI), serial attached SCSI (SAS), parallel ATA (PATA), High Speed Inter-Chip (HSIC), Firewire, Peripheral Component Interconnection (PCI), PCI express (PCIe), Nonvolatile Memory Express (NVMe), Universal Flash Storage (UFS), Secure Digital (SD), Multi-Media Card (MMC), embedded MMC (eMMC), etc.

As previously noted, the data storage device 130 may not include the volatile memory 132. Instead, the data storage device 130 may use a portion of the host memory 120 connected to the host 110. The host 110 may allocate a portion of the host memory 120 to serve, for example, as a host memory buffer 121. The term "host memory buffer" 121 may denote some designated part (or collection of parts) of the host memory 120, as operationally allocated by the host 110 on behalf of the data storage device 130. The HMB 121 may serve as a data buffer between the host 110 and the data storage device 130. The HMB 121 may be helpful to expedite the data access between the host 110 and the data storage device 130.

The host 110 may arbitrarily access (first access) target data stored in the data storage device 130. Subsequently, the host 110 may again (or repeatedly) access (second or subsequent access) the target data (i.e., the most recently accessed data). Alternatively, the host 110 may access data that is adjacent to the target data (adjacent data) during a second or subsequent access. These types of data access may be understood as having a regional characteristic (i.e., "data locality"). That is, subsequently accessed data will be proximate to or identical (wholly or in part) to data recently or most recently accessed. Recognizing this regional characteristic in certain types of data, and corresponding data access, the HMB 121 may be helpful to expedite the data access between the host 110 and the data storage device 130.

Figure 2:
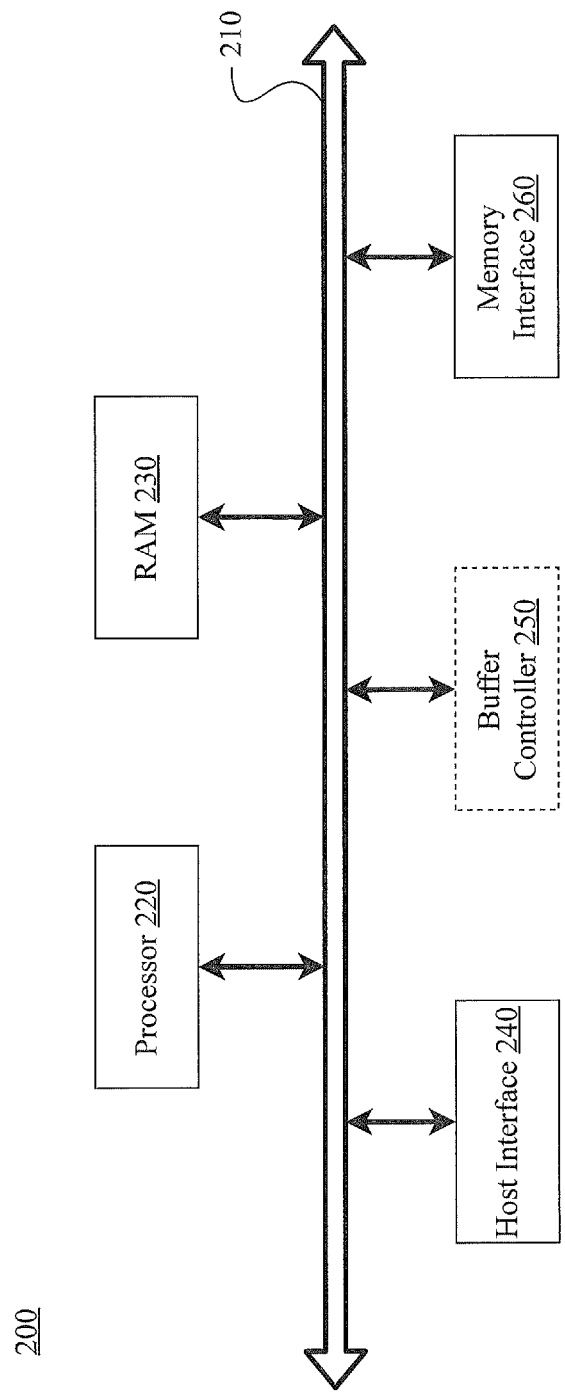
FIG. 2 is a block diagram illustrating a controller in accordance with some embodiments of the present disclosure.

FIG. 2 is a block diagram further illustrating a controller 200 in accordance with some embodiments of the present disclosure. The controller 200 may be a possible example of the controller 131 shown in FIG. 1. Referring to FIG. 2, the controller 200 may include a bus 210, a processor 220, a RAM 230, a host interface 240, a buffer controller 250, and a memory interface 260. In some embodiments, the controller 200 may not include a buffer controller 250.

The bus 210 is configured to provide a channel between constituent elements of the controller 200. The processor 220 may control an overall operation of the controller 200 and perform logical operations. The processor 220 may communicate with an external host (e.g., the host 110 shown in FIG. 1) through the host interface 240. The processor 220 may store a command or an address received from the host interface 240 in the RAM 230.

The RAM 230 may be used as an operation memory, a cache memory, or a buffer memory of the processor 220. The RAM 230 may store codes and commands executed by the processor 220. The RAM 230 may store data processed by the processor 220. The RAM 230 may include a SRAM.

The host interface 240 is configured to communicate with the host 110 under the control of the processor 220. The host interface 240 may be configured to perform a communication using at least one of the various protocols described above in relation to FIG. 1.

In certain embodiments, the buffer controller 250 may be included to control a buffer (e.g., DRAM) built in the data storage device. However, since a buffer is not included in the data storage device 130 and the controller 200 performs data I/O operation(s)(the loading of a mapping table, etc., using the host memory buffer 121), the buffer controller 250 need not be included in the controller 200. Thus, the overall size and cost of the data storage device 130 may be decreased.

Referring still to FIGS. 1 and 2, the use of the volatile memory 132, when present, may be controlled by the processor 220. In the computer system 100, including a data storage device 130 in accordance with some embodiments of the present disclosure, the data storage device 130 need not include the volatile memory 132. Thus, the data storage device 130 may not include the buffer controller 250.

The memory interface 260 may communicate with the non-volatile memories 133a to 133d (refer to FIG. 1) under the control of the processor 220.

Figure 3:
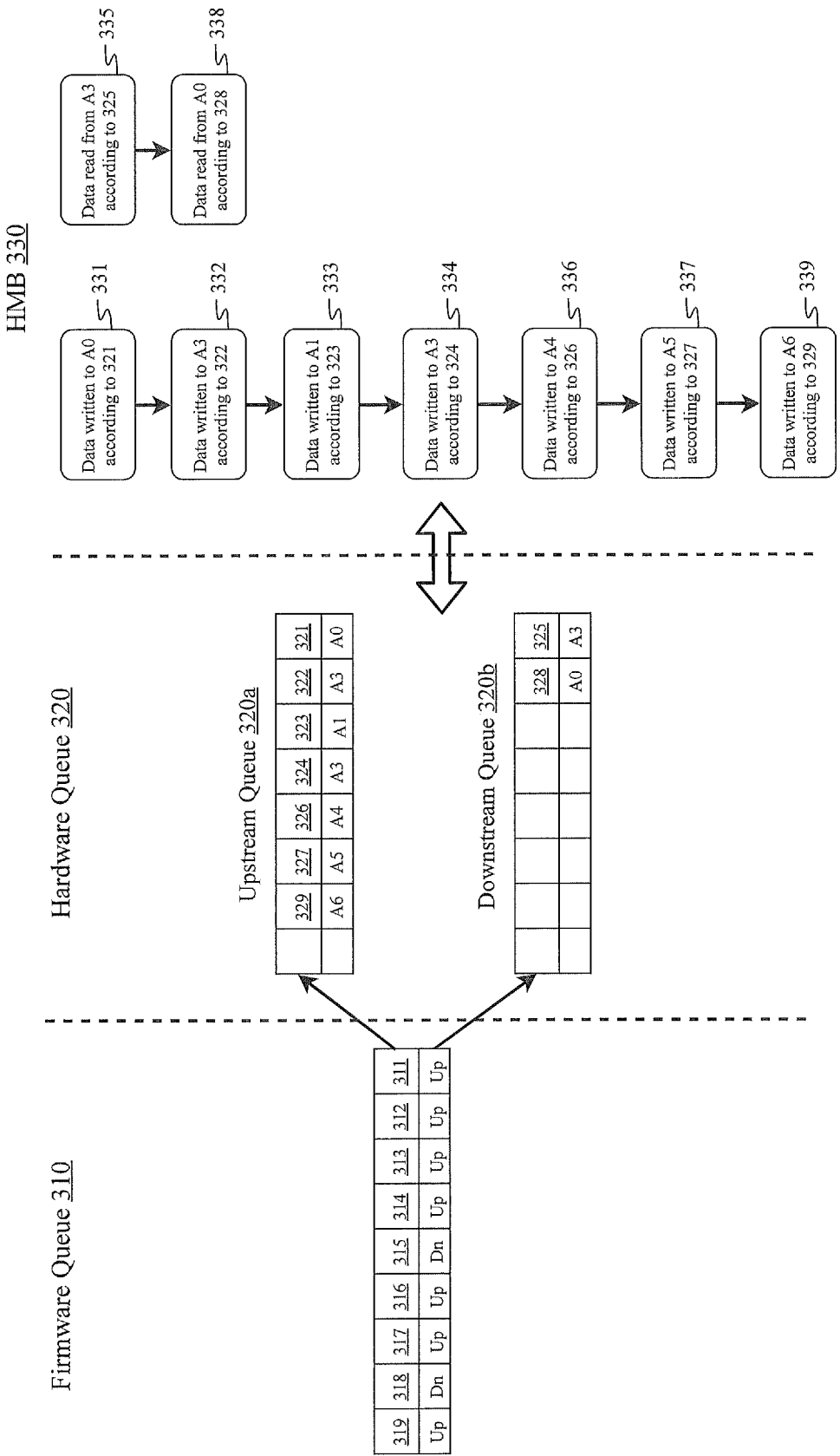
FIG. 3 is a schematic diagram illustrating queues and operations for a computer system in accordance with some embodiments of the present disclosure.

FIG. 3 is a schematic diagram illustrating queues and operations for the computer system 100 in accordance with some embodiments of the present disclosure. FIG. 3 may illustrate queues for a data storage device 130 and operations for the host 110.

FIG. 3 discloses a firmware queue 310 and a hardware queue 320. The firmware queue 310 may be implemented by a program at a level higher than that of the program implementing the hardware queue 320. In some embodiments, the firmware queue 310 may be implemented through a firmware executed by the controller 131 shown in FIG. 1. In some embodiments, the hardware queue 320 may be implemented through the processor 220, the RAM 230, the host interface 240, and the memory interface 260 shown in FIG. 2.

FIG. 3 discloses an HMB 330. The HMB 330 may be similar the HMB 121 shown in FIG. 1. The HMB 330 may be a portion of host memory included in a host and may be implemented through a software or a firmware executed by the host.

Referring to FIG. 3, several commands may be queued in the firmware queue 310. Each of the commands queued in the firmware queue 310 may include the associated data block, data length, action, and memory address. Commands 311 to 319 may be queued in the firmware queue 310. Command 311 may be at the front of the firmware queue 310. Command 319 may be at the rear of the firmware queue 310. Commands 311, 312, 313, 314, 316, 317, and 319 may be upstream commands (e.g., the commands cause data transmitted from the data storage device 130 to the host 110). Commands 315 and 318 may be downstream commands (e.g., the commands cause data transmitted from the host 110 to the data storage device 130).

The commands in the firmware queue 310 may be popped and executed. The commands in the firmware queue 310 may be processed in a half-duplex way. According to the first-in-first-out principle of a queue, the commands 311-319 may be popped and executed in sequence, i.e., the command 311 is popped and executed first, and the command 312 is popped and executed.

Referring to FIG. 3, the hardware queue 320 may include an upstream queue 320a and a downstream queue 320b. Commands 321, 322, 323, 324, 326, 327, and 329 may be queued in the upstream queue 320a. Each of the commands queued in the upstream queue 320a may include the associated data block, data length, and memory address. Commands 325 and 328 may be queued in the upstream queue 320b. Each of the commands queued in the downstream queue 320b may include the associated data block, data length, and memory address.

After a command in the firmware queue 310 is popped and executed, a corresponding command may be generated and pushed into the hardware queue 320. For example, after the command 311 in the firmware queue 310 is popped and executed, the corresponding command 321 may be generated and pushed into the upstream queue 320a. After the command 312 in the firmware queue 310 is popped and executed, the corresponding command 322 may be generated and pushed into the upstream queue 320a. After the command 313 in the firmware queue 310 is popped and executed, the corresponding command 323 may be generated and pushed into the upstream queue 320a. After the command 314 in the firmware queue 310 is popped and executed, the corresponding command 324 may be generated and pushed into the upstream queue 320a. After the command 315 in the firmware queue 310 is popped and executed, the corresponding command 325 may be generated and pushed into the downstream queue 320b. After the command 316 in the firmware queue 310 is popped and executed, the corresponding command 326 may be generated and pushed into the upstream queue 320a. After the command 317 in the firmware queue 310 is popped and executed, the corresponding command 327 may be generated and pushed into the upstream queue 320a. After the command 318 in the firmware queue 310 is popped and executed, the corresponding command 328 may be generated and pushed into the downstream queue 320b. After the command 319 in the firmware queue 310 is popped and executed, the corresponding command 329 may be generated and pushed into the upstream queue 320a.

The commands in the hardware queue 320 may be processed in a full-duplex way. The commands in the upstream queue 320a and the commands in the downstream queue 320b may be processed in parallel. For example, the commands 321 and 325 may be popped and executed simultaneously. When a command in the hardware queue 320 is popped and executed, a host (e.g., the host 110) may be required to perform some operations for the HMB 330.

The interface between the hardware queue 320 and the HMB 330 may be an interface between the data storage device 130 and the host 110. The interface between the hardware queue 320 and the HMB 330 may support communication using at least one of the standards associated with the Universal Serial Bus (USB), Advanced Technology Attachment (ATA), serial ATA (SATA), Small Computer Small Interface (SCSI), serial attached SCSI (SAS), parallel ATA (PATA), High Speed Inter-Chip (HSIC), Firewire, Peripheral Component Interconnection (PCI), PCI express (PCIe), Nonvolatile Memory Express (NVMe), Universal Flash Storage (UFS), Secure Digital (SD), Multi-Media Card (MMC), embedded MMC (eMMC), etc.

In the upstream queue 320a, when the command 321 is popped and executed, the data associated with the command 321 may be written to address A0 of the HMB 330 (e.g., HMB address A0). When the command 322 is popped and executed, the data associated with the command 322 may be written to address A3 of the HMB 330 (e.g., HMB address A3). When the command 323 is popped and executed, the data associated with the command 323 may be written to address A1 of the HMB 330. When the command 324 is popped and executed, the data associated with the command 324 may be written to address A3 of the HMB 330. When the command 326 is popped and executed, the data associated with the command 326 may be written to address A4 of the HMB 330. When the command 327 is popped and executed, the data associated with the command 327 may be written to address A5 of the HMB 330. When the command 329 is popped and executed, the data associated with the command 329 may be written to address A6 of the HMB 330.

In the downstream queue 320b, when the command 325 is popped and executed, the data associated with the command 325 may be read from address A3 of the HMB 330 (e.g., HMB address A3). When the command 328 is popped and executed, the data associated with the command 328 may be read from address A0 of the HMB 330.

In the HMB 330, operations may be performed according to the commands in the hardware queue 320. In operation 331, the associated data may be written to address A0 according to 321. In operation 332, the associated data may be written to address A3 according to 322. In operation 333, the associated data may be written to address A1 according to 323. In operation 334, the associated data may be written to address A3 according to 324. In operation 336, the associated data may be written to address A4 according to 326. In operation 337, the associated data may be written to address A5 according to 327. In operation 339, the associated data may be written to address A6 according to 321.

In operation 335, the associated data may be read from address A3 according to 325. In operation 338, the associated data may be read from address A0 according to 328. The operations 331, 332, 333, 334, 336, 337, and 339 may be performed in parallel with the operations 335 and 338. For example, operations 331 and 335 may be performed simultaneously.

Referring to firmware queue 310, the downstream command 315 should be executed after the upstream commands 311 to 314. Taking the sequence of the commands 311 to 315 in the firmware queue 310 into consideration, the command 325 in the downstream queue 320b should be used to read the data at address A3, which is written according to the command 324. However, in the HMB 330, operations 331 and 335 may be performed simultaneously, and the operation 335 may be performed prior to operation 334. Since operation 334 may be performed after the operation 335, the data read from address A3 in operation 335 may not be the data written to address A3 according to command 324, and erroneous data read may be caused. This issue may be caused by the mismatch between the order of the commands in the firmware queue 310 and that of the popped commands from the hardware queue 320. This issue may be caused by the mismatch between the order of the commands in the firmware queue 310 and that of the operations performed in the HMB 330.

Figure 4A:
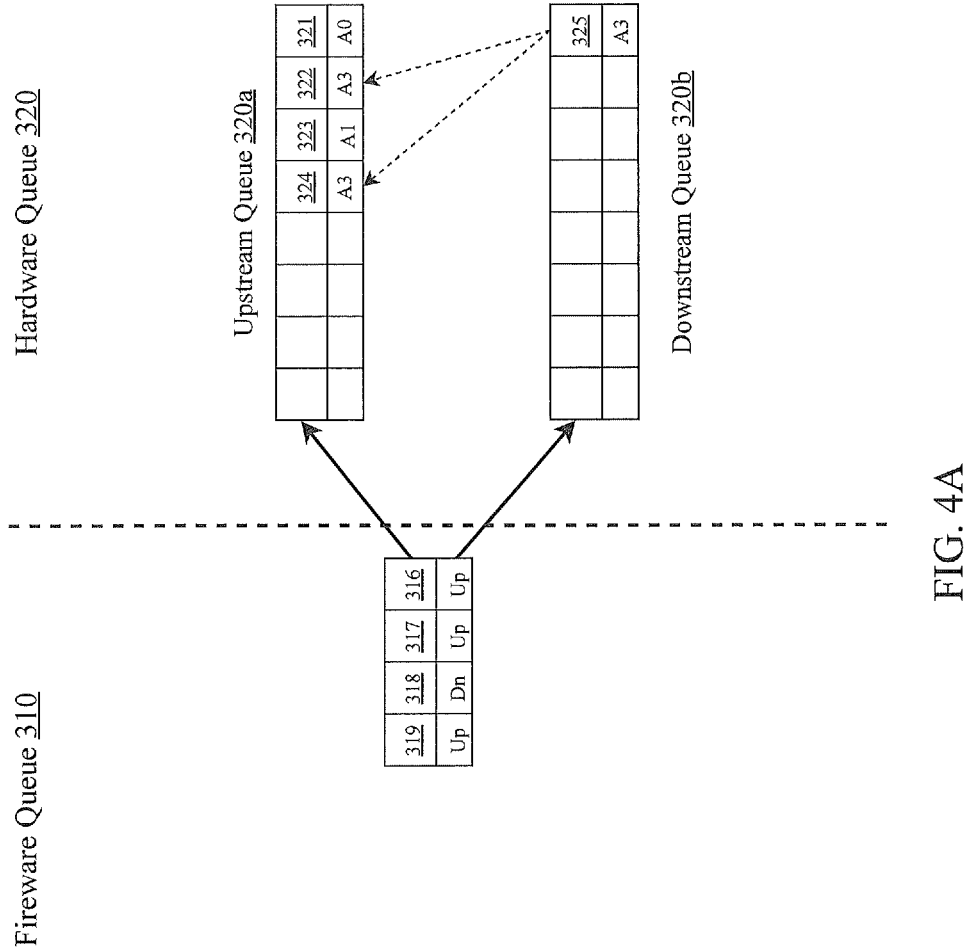
FIGS. 4A and 4B are schematic diagrams illustrating queues of a computer system in accordance with some embodiments of the present disclosure.

FIG. 4A is a schematic diagram illustrating queues of a computer system 100 in accordance with some embodiments of the present disclosure. FIG. 4A may illustrate queues for a data storage device 130.

The firmware queue 310 and hardware queue 320 in FIG. 4A may be similar to those in FIG. 3. In firmware queue 310 of FIG. 4A, the commands 311 to 315 have been popped and executed, and the corresponding commands 321 to 325 are generated and pushed into the hardware queue 320.

After the commands 311 to 314 in the firmware queue 310 are popped and executed, the corresponding commands 321 to 324 may be generated and pushed into the upstream queue 320a. After the command 315 in the firmware queue 310 is popped and executed, the corresponding command 325 may be generated and pushed into the downstream queue 320b. When the command 325 is pushed into the downstream queue 320b, a controller (e.g., the controller 131) may perform an operation to check if the access region to be read according to the command 325 overlaps with the access region to be written according to one or more commands queued in the upstream queue 320a. In some embodiments, the access region may be determined based on the address of the HMB to be written or read (e.g., the HMB address) and the data length to be written or read (e.g., the HMB size).

For example, when command 325 is pushed into the downstream queue 320b, the controller (e.g., the controller 131) may check if the access region to be read according to the command 325 (e.g., HMB address A3) overlaps with the access region to be written according to one or more of commands 321 to 324. After checking with the commands 321 to 324, it is determined that the access region to be written according to the commands 322 and 324 (e.g., HMB address A3) overlaps with the access region to be read according to the command 325. Thus, the command 325 may be popped and executed after the commands 322 and 324. Popping and execution of the command 325 may be delayed until the commands 322 and 324 have been popped and executed.

Figure 4B:
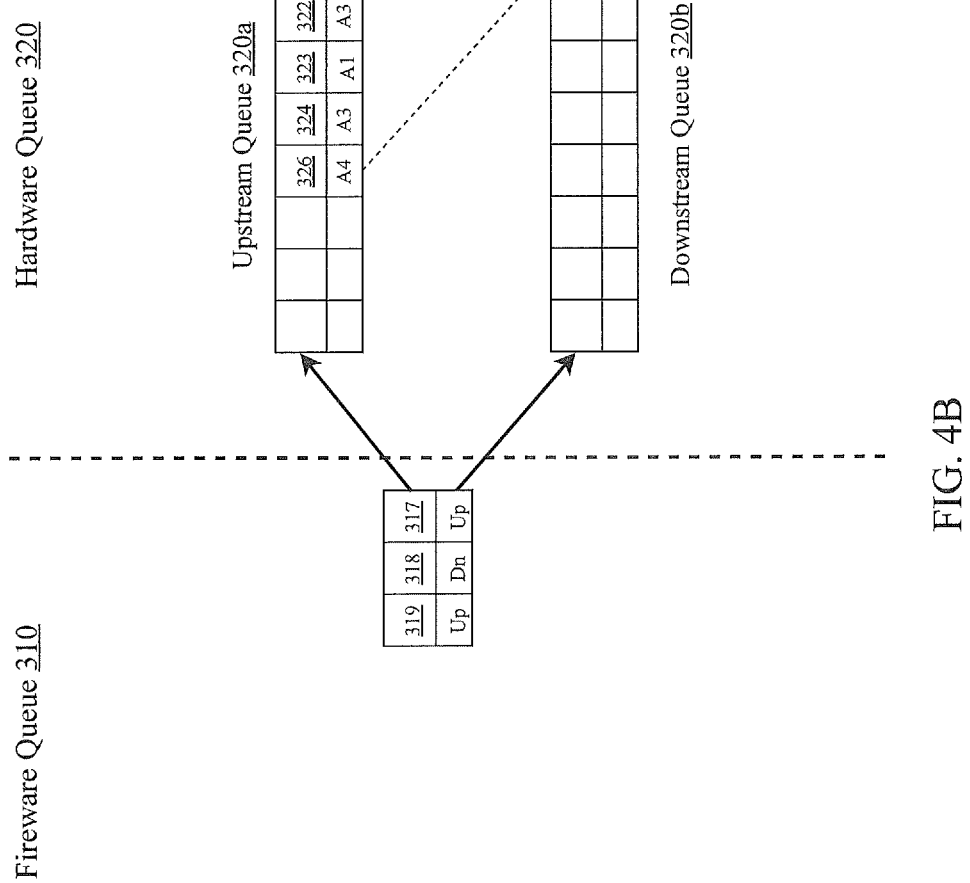

FIG. 4B is a schematic diagram illustrating queues of a computer system 100 in accordance with some embodiments of the present disclosure. FIG. 4B may illustrate queues for a data storage device 130. FIG. 4B may be similar to FIG. 4A. Compared with the FIG. 4A, the command 316 in the firmware queue 310 has been popped and executed, and the corresponding command 326 is generated and pushed into hardware queue 320.

When a new upstream command is pushed into the upstream queue 320a, a controller (e.g., the controller 131) may perform an operation to check if the access region to be written according to the new command pushed into the upstream queue 320a overlaps with the access region to be read according to one or more commands queued in the downstream queue 320b.

For example, when command 326 is pushed into upstream queue 320a, the controller may check if the access region to be written according to the command 326 (e.g., HMB address A4) overlaps with the access region to be read according to the command 325. Upon checking with the command 325 queued in the downstream queue 320b, because the access region to be read according to the command 325 is A3 rather than A4, it is determined that the access region to be written according to the command 326 (e.g., HMB address A4) does not overlap with the access region(s) to be read according to the commands queued in the downstream queue 320b.

FIGS. 5A-5F are schematic diagrams illustrating queues and information arrays of a computer system in accordance with some embodiments of the present disclosure. In FIGS. 5A-5F, the firmware queue 310 may be identical to that shown in FIG. 3.

FIGS. 5A-5F disclose an upstream command information array 510 and a downstream command information array 520. The upstream command information array 510 and the downstream command information array 520 may include the information associated with the executions of the commands in firmware queue 310. The upstream command information array 510 and the downstream command information array 520 may include the information associated with the commands in the hardware queue 320. The upstream command information array 510 may include the information associated with the commands in the upstream queue 320a. The downstream command information array 520 may include the information associated with the commands in the downstream queue 320b.

The upstream command information array 510 may include several characteristics, e.g., HMB address 511 (byte), HMB size 512 (bytes), serial number 513 (of the commands queued in the upstream queue 320a), and order tag 514. The downstream command information array 520 may include several characteristics, e.g., HMB address 521 (byte), HMB size 522 (bytes), serial number 523 (of the commands queued in the downstream queue 320b), and order tag 524. As shown in FIGS. 5A-5F, the HMB address 511, the HMB size 512, the serial number 513, the order tag

514, the HMB address 521, the HMB size 522, the serial number 523, and the order tag 524 may be recorded in hexadecimal values.

After the commands 311 to 314 in the firmware queue 310 are popped and executed, the information of the corresponding commands (e.g., commands 321 to 324) may be recorded in the upstream command information array 510. The entry 531 may correspond to the execution of the command 311 in firmware queue 310. The entry 532 may correspond to the execution of the command 312 in firmware queue 310. The entry 533 may correspond to the execution of the command 313 in firmware queue 310. The entry 534 may correspond to the execution of the command 314 in firmware queue 310. In some embodiments, the entries 531 to 534 may correspond to the commands 321 to 324, respectively, in upstream queue 320*a*.

The HMB address 511 and HMB size 512 may be used to determine an access region of the HMB to be written according to the corresponding command. For example, with respect to the entry 531, the HMB address 511 is 0xA000 and the HMB size 512 is 0x300; these two characteristics may be used to determine a access region to be written according to the corresponding command (e.g., command 321). The serial numbers 513 with respect to the entries 531 to 534 may be numbered in sequence. That is, the serial numbers of entries 531 to 534 are 0x0, 0x02, 0x03, and 0x04, respectively. The order tag 514 with respect to the entries 531 to 534 may be assigned with a default value. In FIG. 5A, all the order tags of the entries 531 to 534 are assigned with a default value of 0x20.

Figure 5B:
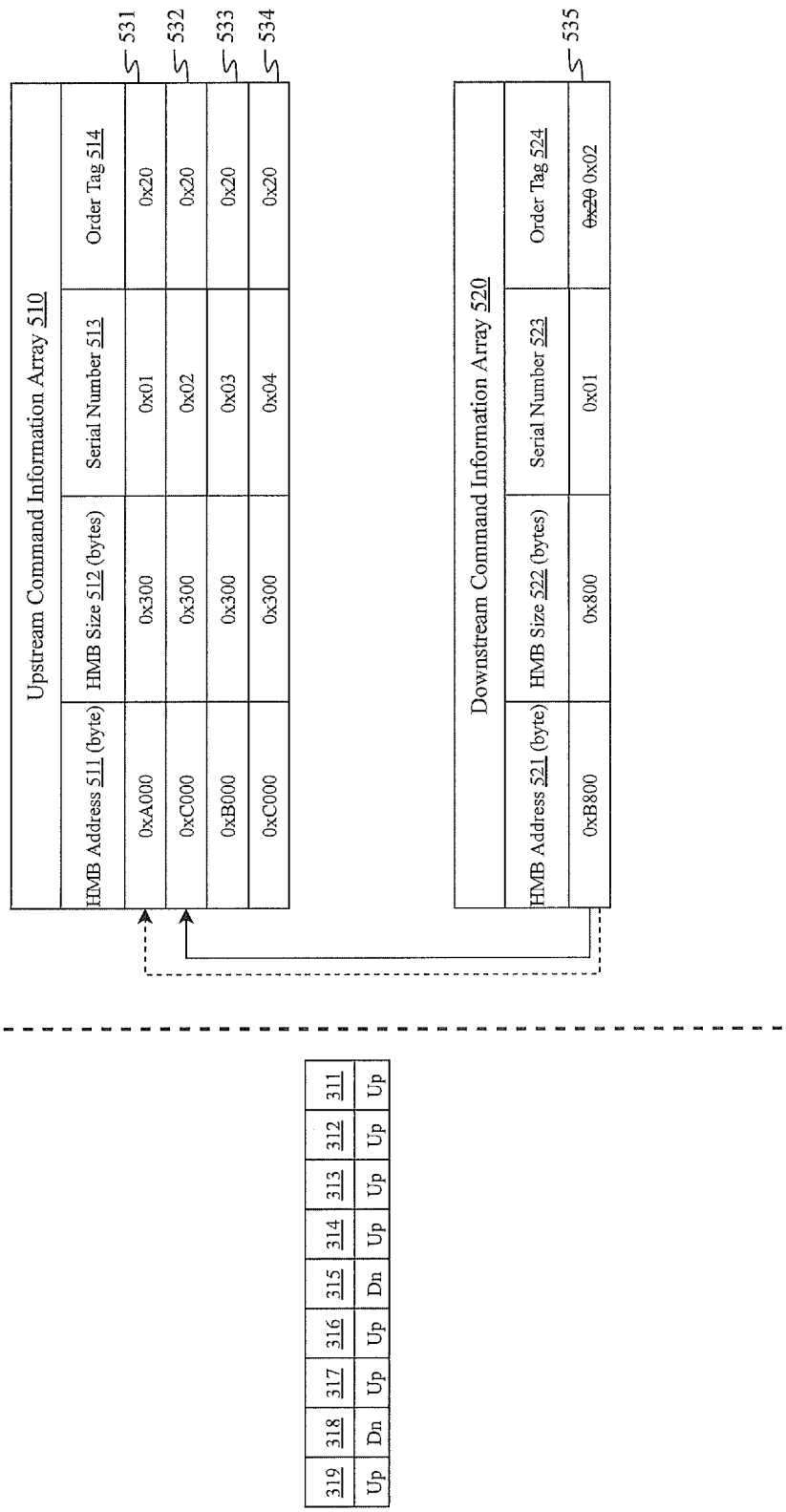

Referring to FIG. 5B, entry 535 is added relative to the FIG. 5A. After the command 315 in the firmware queue 310 is popped and executed, the information of the corresponding commands (e.g., command 325) may be recorded in the downstream command information array 520. The entry 535 may correspond to the execution of the command 315 in firmware queue 310. In some embodiments, the entry 535 may correspond to the command 325 in downstream queue 320*b*.

The HMB address 521 and HMB size 522 may be used to determine an access region of the HMB to be read according to the corresponding command. For example, with respect to the entry 535, the HMB address 521 is 0xB800 and the HMB size 522 is 0x800; these two characteristics may be used to determine a access region to be read according to the corresponding command (e.g., command 325). The serial number 523 with respect to the entries in the downstream command information array 520 may be numbered sequentially. That is, the serial number of entry 535 is 0x01. The order tag 524 with respect to the entry 535 may be initially assigned with a default value. In FIG. 5B, the order tag of the entry 535 is initially assigned with a default value of 0x20.

When command 325 is pushed into the downstream queue 320*b*, a controller (e.g., the controller 131) may check if the access region to be read according to the command 325 (e.g., HMB address A3) overlaps with the access region to be written according to one or more of the commands queued in the upstream queue 320*a* (e.g., the commands 321 to 324). When the entry 535 is pushed into the downstream command information array 520, a controller (e.g., the controller 131) may check if the access region defined by the entry 535 (e.g., the access region to be read) overlaps with the access region defined by one or more entries in the upstream command information array 510 (e.g., the entries 531 to 534).

Referring to FIG. 5B, it may be checked if the access region to be read according to the entry 535 (may correspond to the command 325) overlaps with the access region to be written according to one or more of the entries 531 to 534 (may correspond to the commands 321 to 324). The access region to be read according to the entry 535 may be determined by the HMB address 0xB800 and the HMB Size 0x800; the access region to be read according to the entry 535 may be from the HMB address 0xB800 to the HMB address 0xC000.

The access region to be written according to the entry 531 may be determined by the HMB address 0xA000 and the HMB Size 0x300; the access region to be written according to the entry 531 may be from the HMB address 0xA000 to the HMB address 0xA300. The access region to be written according to the entry 532 may be determined by the HMB address 0xC000 and the HMB Size 0x300; the access region to be written according to the entry 532 may be from the HMB address 0xC000 to the HMB address 0xC300.

Therefore, it may be determined that the memory to be read according to the entry 535 overlaps with the access region to be written according to the entry 532. Then, the order tag in entry 535 may be changed from 0x20 (e.g., the default value) to the serial number of the entry 532 (e.g., 0x02).

Figure 5C:
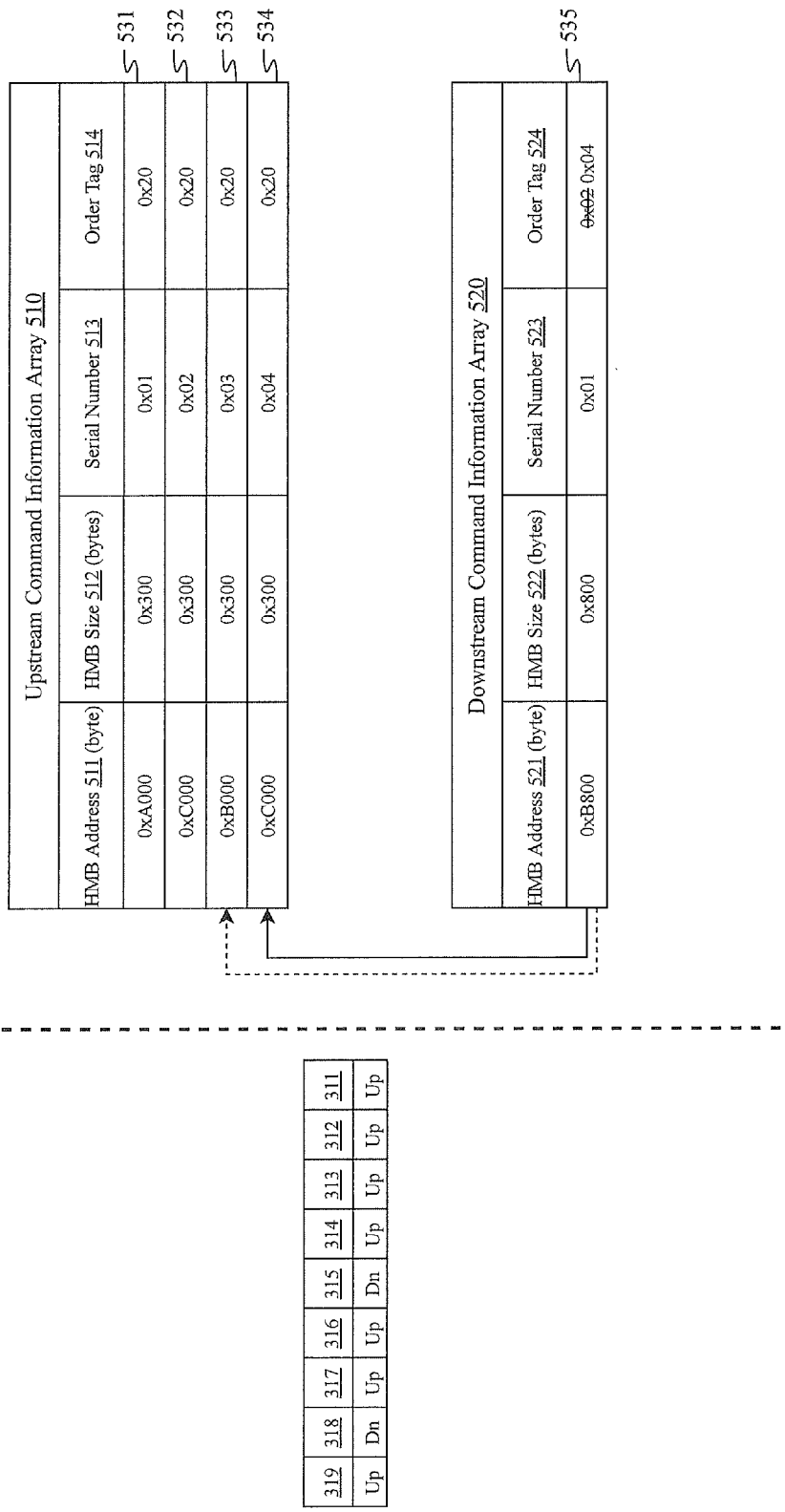

Referring to FIG. 5C, the access region to be written according to the entry 533 may be determined by the HMB address 0xB000 and the HMB Size 0x300; the access region to be written according to the entry 533 may be from the HMB address 0xB000 to the HMB address 0xB300. The access region to be written according to the entry 534 may be determined by the HMB address 0xC000 and the HMB Size 0x300; the access region to be written according to the entry 534 may be from the HMB address 0xC000 to the HMB address 0xC300.

Therefore, it may be determined that the memory to be read according to the entry 535 overlaps with the access region to be written according to the entry 534. Then, the order tag in entry 535 may be changed from 0x02 (i.e., the serial number of the entry 532) to the serial number of the entry 534 (e.g., 0x04).

Figure 5D:
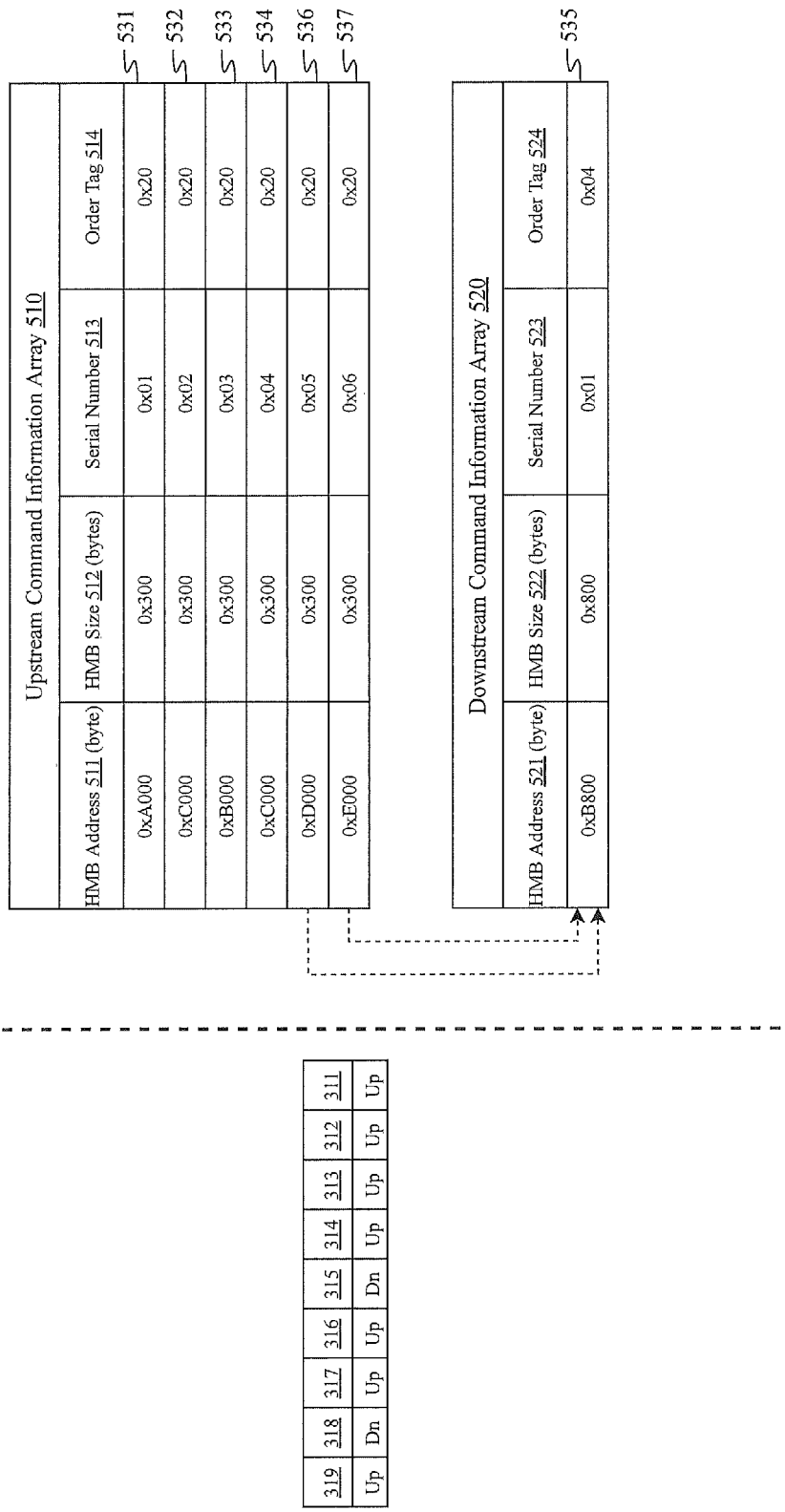

Referring to FIG. 5D, entries 536 and 537 are added relative to the FIG. 5C. After the commands 316 and 317 in the firmware queue 310 are popped and executed in sequence, the information of the corresponding commands (e.g., commands 326 and 327) may be recorded in the upstream command information array 510 in sequence. The entries 536 and 537 may correspond to the execution of the commands 316 and 317, respectively, in firmware queue 310. In some embodiments, the entries 536 and 537 may correspond to the commands 326 and 327, respectively, in upstream queue 320*a*.

With respect to the entry 536, the HMB address 511 is 0xD000 and the HMB size 522 is 0x300; these two characteristics may be used to determine a access region to be written according to the corresponding command (e.g., command 326). With respect to the entry 537, the HMB address 511 is 0xE000 and the HMB size 522 is 0x300; these two characteristics may be used to determine a access region to be written according to the corresponding command (e.g., command 327). The serial number 513 with respect to the entries in the upstream command information array 510 may be numbered in sequence. That is, the serial numbers of the entries 536 and 537 are 0x05 and 0x06, respectively. The order tag 514 with respect to the entries 536 and 537 may be initially assigned with a default value. In FIG. 5D, the order tag of the entries 536 and 537 are initially assigned with a default value of 0x20.

When command 326 is pushed into the upstream queue 320a, a controller (e.g., the controller 131) may check if the access region to be written according to the command 326 (e.g., H M B address A4) overlaps with the access region to be read according to one or more of the commands queued in the downstream 320b (e.g., the command 325). When the entry 536 is pushed into the upstream command information array 510, a controller (e.g., the controller 131) may check if the access region defined by the entry 536 (e.g., the access region to be written) overlaps with the access region defined by one or more entries in the downstream command information array 520 (e.g., the entry 535).

When command 327 is pushed into the downstream queue 320b, a controller (e.g., the controller 131) may check if the access region to be written according to the command 327 (e.g., HMB address A5) overlaps with the access region to be read according to one or more of the commands queued in the downstream 320b (e.g., the command 325). When the entry 537 is pushed into the upstream command information array 510, a controller (e.g., the controller 131) may check if the access region defined by the entry 537 (e.g., the access region to be written) overlaps with the access region defined by one or more entries in the downstream command information array 520 (e.g., the entry 535).

Referring to FIG. 5D, it may be checked if the access region to be written according to the entry 536 (may correspond to the command 326) overlaps with the access region to be read according to the entry 535 (may correspond to the command 325). The access region to be written according to the entry 536 may be determined by the HMB address 0xD000 and the HMB Size 0x300; the access region to be written according to the entry 536 may be from the HMB address 0xD000 to the HMB address 0xD300.

The access region to be read according to the entry 535 may be determined by the HMB address 0xB800 and the HMB Size 0x800; the access region to be written according to the entry 535 may be from the HMB address 0xB800 to the HMB address 0xC000. Therefore, it may be determined that the memory to be written according to the entry 536 does not overlap with the access region to be read according to the entry 535, and the order tag in entry 536 may be kept at 0x20 (e.g., the default value).

Referring to FIG. 5D, it may be determined if the access region to be written according to the entry 537 (may correspond to the command 327) overlaps with the access region to be read according to the entry 535 (may correspond to the command 325). The access region to be written according to the entry 537 may be determined by the HMB address 0xE000 and the HMB Size 0x300; the access region to be written according to the entry 537 may be from the HMB address 0xE000 to the HMB address 0xD300. Therefore, it may be determined that the memory to be written according to the entry 537 does not overlap with the access region to be read according to the entry 535, and the order tag in entry 537 may be kept at 0x20 (e.g., the default value).

Figure 5E:
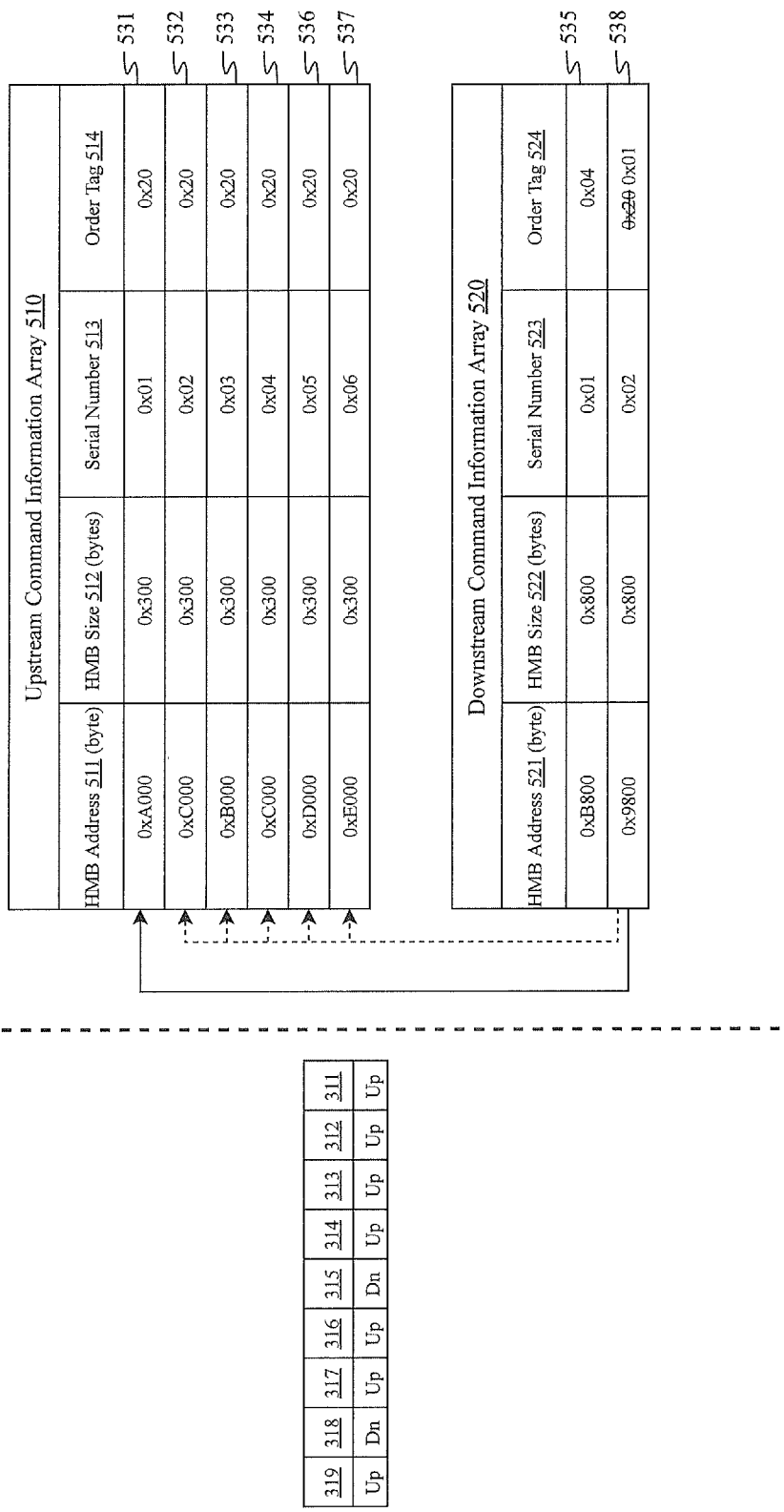

Referring to FIG. 5E, entry 538 is added relative to the FIG. 5D. After the command 318 in the firmware queue 310 is popped and executed, the information of the corresponding commands (e.g., command 328) may be recorded in the downstream command information array 520. The entry 538 may correspond to the execution of the command 318 in firmware queue 310. In some embodiments, the entry 538 may correspond to the command 328 in downstream queue 320b.

With respect to the entry 538, the HMB address 521 is 0x9800 and the HMB size 522 is 0x800; these two characteristics may be used to determine a access region to be read according to the corresponding command (e.g., command 328). The serial number 523 with respect to the entries in the downstream command information array 520 may be numbered in sequence. That is, the serial numbers of entry 538 is 0x02. The order tag 524 with respect to the entry 535 may be initially assigned with a default value. In FIG. 5E, the order tag of the entry 538 is initially assigned with a default value of 0x20.

When command 328 is pushed into the downstream queue 320b, a controller (e.g., the controller 131) may check if the access region to be read according to the command 328 (e.g., HMB address A3) overlaps with the access region to be written according to one or more of the commands queued in the upstream queue 320a (e.g., the commands 321 to 324, 326 and 327). When the entry 538 is pushed into the downstream command information array 520, a controller (e.g., the controller 131) may check if the access region defined by the entry 538 (e.g., the access region to be read) overlaps with the access region defined by one or more entries in the upstream command information array 510 (e.g., the entries 531 to 534, 536, and 537).

Referring to FIG. 5E, it may be checked if the access region to be read according to the entry 538 (may correspond to the command 328) overlaps with the access region to be written according to one or more of the entries 531 to 534, 536, and 537 (may correspond to the commands 321 to 324, 326 and 327). The access region to be read according to the entry 538 may be determined by the HMB address 0x9800 and the HMB Size 0x800; the access region to be read according to the entry 538 may be from the HMB address 0x9800 to the HMB address 0xA000.

The access region to be written according to the entry 531 may be determined by the HMB address 0xA000 and the HMB Size 0x300; the access region to be written according to the entry 531 may be from the HMB address 0xA000 to the HMB address 0xA300. Therefore, it may be determined that the memory to be read according to the entry 538 overlaps with the access region to be written according to the entry 531. Then, the order tag in entry 538 may be changed from 0x20 (e.g., the default value) to the serial number of the entry 531 (e.g., 0x01).

The access region to be written according to the entry 532 may be from the HMB address 0xC000 to the HMB address 0xC300. The access region to be written according to the entry 533 may be from the HMB address 0xB000 to the HMB address 0xB300. The access region to be written according to the entry 534 may be from the HMB address 0xC000 to the HMB address 0xC300. The access region to be written according to the entry 536 may be from the HMB address 0xD000 to the HMB address 0xD300. The access region to be written according to the entry 537 may be from the HMB address 0xE000 to the HMB address 0xD300. Therefore, it may be determined that the memory to be read according to the entry 538 does not overlap with the access region to be written according to the entry 532 to 534, 536, and 537, and the order tag in entry 538 may be kept at 0x01 (e.g., the default value).

Referring to FIG. 5F, entry 539 is added relative to the FIG. 5E. After the command 319 in the firmware queue 310 is popped and executed, the information of the corresponding command (e.g., command 329) may be recorded in the upstream command information array 510 in sequence. The entry 539 may correspond to the execution of the command 319 in firmware queue 310. In some embodiments, the entry 539 may correspond to the command 329 in downstream queue 320b.

With respect to the entry 539, the HMB address 511 is 0xF000 and the HMB size 522 is 0x300; these two characteristics may be used to determine a access region to be written according to the corresponding command (e.g., command 329). The serial number 513 with respect to the entries in the upstream command information array 510 may be numbered in sequence. That is, the serial numbers of the entry 539 is 0x07. The order tag 514 with respect to the entry 539 may be initially assigned with a default value. In FIG. 5F, the order tag of the entry 539 is initially assigned with a default value of 0x20.

When command 329 is pushed into the upstream queue 320a, a controller (e.g., the controller 131) may check if the access region to be written according to the command 329 (e.g., HMB address A6) overlaps with the access region to be read according to one or more of the commands queued in the downstream 320b (e.g., the commands 325 and 328). When the entry 539 is pushed into the upstream command information array 510, a controller (e.g., the controller 131) may check if the access region defined by the entry 539 (e.g., the access region to be written) overlaps with the access region defined by one or more entries in the downstream command information array 520 (e.g., the entries 535 and 538).

Referring to FIG. 5F, it may be checked if the access region to be written according to the entry 539 (may correspond to the command 329) overlaps with the access region to be read according to the entries 535 and 538 (may correspond to the commands 325 and 328). The access region to be written according to the entry 539 may be determined by the HMB address 0xF000 and the HMB Size 0x300; the access region to be written according to the entry 539 may be from the HMB address 0xF000 to the HMB address 0xF300.

The access region to be written according to the entry 535 may be from the HMB address 0xB800 to the HMB address 0xC000. The access region to be read according to the entry 538 may be from the HMB address 0x9800 to the HMB address 0xA000. Therefore, it may be determined that the memory to be written according to the entry 539 does not overlap with the access region to be read according to the entry 535 or 538, and the order tag in entry 539 may be kept at 0x20 (e.g., the default value).

Figure 6C:
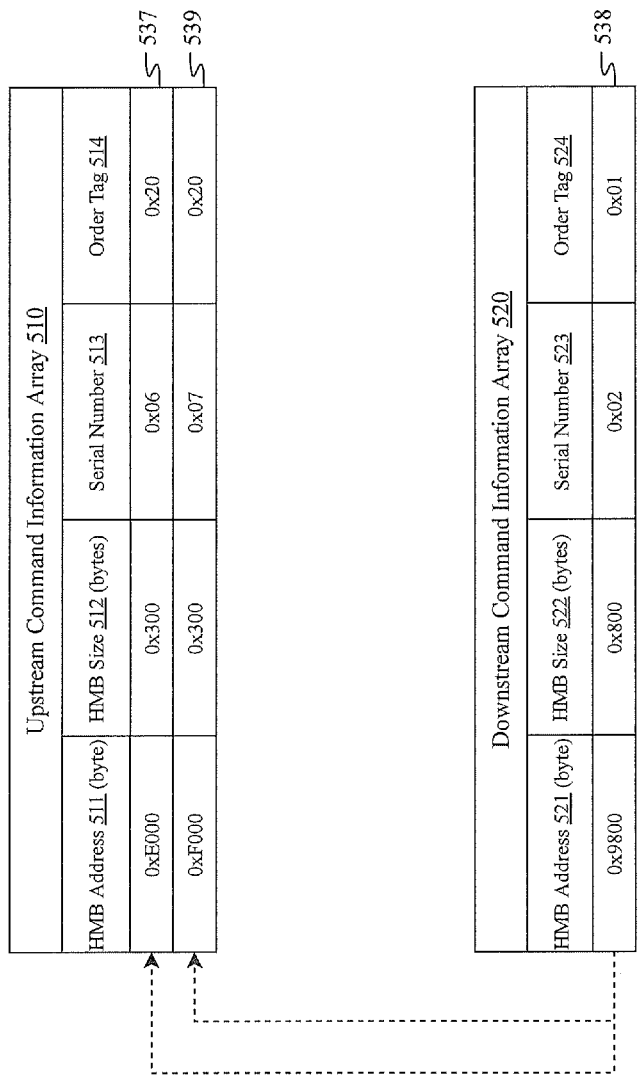

FIGS. 6A-6C are schematic diagrams illustrating information arrays of a computer system in accordance with some embodiments of the present disclosure.

FIG. 6A discloses an upstream command information array 510 and a downstream command information array 520. The upstream command information array 510 and the downstream command information array 520 may be similar to those shown in FIG. 5F. Compared with FIG. 5F, the upstream command information array 510 may not include the entry 531, in which the entry 531 may be deleted because the corresponding command (e.g., the command 321 in the upstream queue 320a) has been popped and executed.

Referring to FIG. 6A, before the corresponding command of the entry 535 (e.g., the command 325 in the downstream queue 320b) is popped and executed, a controller (e.g., the controller 131) may check if the corresponding command can be popped and executed at this time. The controller may check if the corresponding command of the entry 535 (e.g., the command 325 in the downstream queue 320b) can be popped and executed at this time based on the information of the entry 535 and the information in the upstream command information array 510. In some embodiments, the controller may check if the corresponding command of the entry 535 (e.g., the command 325 in the downstream queue 320b) can be popped and executed at this time based on the order tag of the entry 535 and the serial numbers of the entries in the upstream command information array 510.

First, before the corresponding command of the entry 535 (e.g., the command 325 in the downstream queue 320b) is popped and executed, it may be determined if a check is necessary based on the order tag of the entry 535. For example, when the entry 535 is added into the downstream command information array 520, if the access region to be read according to the entry 535 does not overlap with the access region to be written according to one or more of the entries in the upstream command information array 510, the entry 535 may be set to a default value. Thus, if the order tag of the entry 535 is equal to the default value, a check before the corresponding command being popped and executed may not be necessary.

In FIGS. 6A-6C, the order tags of the entries in the upstream command information array 510 may be the default value (e.g., 0x20). Therefore, a check before the corresponding commands of the entries in the upstream command information array 510 being popped and executed may not be necessary.

Referring to FIG. 6A, because the order tag of entry 535 is not equal to the default value (e.g., 0x20), a check before the corresponding command being popped and executed may be necessary. It may be determined if the serial number of an entry in the upstream command information array 510 is equal to the order tag of the entry 535.

The review of the serial number of the entries in the upstream command information array 510 may begin from the top of the upstream command information array 510 (e.g., from the front of the upstream queue 320a). It may be determined that the serial number of the entry 532 is not equal to the order tag of entry 535, and the review of the serial numbers may continue for the next entry (e.g., the entry 533). It may be determined that the serial number of the entry 533 is not equal to the order tag of entry 535, and the review of the serial numbers may continue for the next entry (e.g., the entry 534). It may be determined that the serial number of the entry 534 is equal to the order tag of entry 535, and the review of the serial numbers may stop. Since it is determined that the serial number of the entry 534 is equal to the order tag of the entry 535, the corresponding command of the entry 535 (e.g., the command 325 in the downstream queue 320b) may be popped and executed until the corresponding command of the entry 534 (e.g., the command 324 in the upstream queue 320a) has been popped and executed.

FIG. 6B discloses an upstream command information array 510 and a downstream command information array 520. The upstream command information array 510 and the downstream command information array 520 may be similar to those shown in FIG. 6A. Compared with FIG. 6A, the upstream command information array 510 may not include the entries 532, 533, and 534, in which the entries 532, 533, and 534 may be deleted because the corresponding commands (e.g., the commands 322, 323, and 324 in the upstream queue 320a) have been popped and executed.

Referring to FIG. 6B, because the order tag of entry 535 is not equal to the default value (e.g., 0x20), a check before the corresponding command being popped and executed may be necessary. It may be determined if the serial number of an entry in the upstream command information array 510 is equal to the order tag of the entry 535.

The review of the serial number of the entries in the upstream command information array 510 may begin from the top of the upstream command information array 510 (e.g., from the front of the upstream queue 320a). It may be determined that the serial number of the entry 536 is not equal to the order tag of entry 535, and the review of the serial numbers may continue for the next entry (e.g., the entry 537). It may be determined that the serial number of the entry 537 is not equal to the order tag of entry 535, and the review of the serial numbers may continue for the next entry (e.g., the entry 539). It may be determined that the serial number of the entry 539 is not equal to the order tag of entry 535, and the review of the serial numbers may stop because entry 539 is at the bottom of the upstream command information array 510 (e.g., the corresponding command 329 is at the rear of the upstream queue 320a). Since it is determined that the serial numbers of all entries in the upstream command information array 510 are not equal to the order tag of the entry 535, the corresponding command of the entry 535 (e.g., the command 325 in the downstream queue 320b) may be popped and executed at this time.

FIG. 6C discloses an upstream command information array 510 and a downstream command information array 520. The upstream command information array 510 and the downstream command information array 520 may be similar to those shown in FIG. 6B. Compared with FIG. 6B, the upstream command information array 510 may not include the entry 536, in which the entry 536 may be deleted because the corresponding command (e.g., the command 326 in the upstream queue 320a) has been popped and executed. Compared with FIG. 6B, the downstream command information array 520 may not include the entry 535, in which the entry 535 may be deleted because the corresponding command (e.g., the command 325 in the downstream queue 320b) has been popped and executed.

Referring to FIG. 6C, because the order tag of entry 538 is not equal to the default value (e.g., 0x20), a check before the corresponding command being popped and executed may be necessary. It may be determined if the serial number of an entry in the upstream command information array 510 is equal to the order tag of the entry 538 (i.e., 0x02).

The review of the serial number of the entries in the upstream command information array 510 may begin from the top of the upstream command information array 510 (e.g., from the front of the upstream queue 320a). It may be determined that the serial number of the entry 537 is not equal to the order tag of entry 538, and the review of the serial numbers may continue for the next entry (e.g., the entry 539). It may be determined that the serial number of the entry 539 is not equal to the order tag of entry 538, and the review of the serial numbers may stop because entry 539 is at the bottom of the upstream command information array 510 (e.g., the corresponding command 329 is at the rear of the upstream queue 320a). Since it is determined that the serial numbers of all entries in the upstream command information array 510 are not equal to the order tag of the entry 538, the corresponding command of the entry 538 (e.g., the command 328 in the downstream queue 320b) may be popped and executed at this time.

Figure 7:
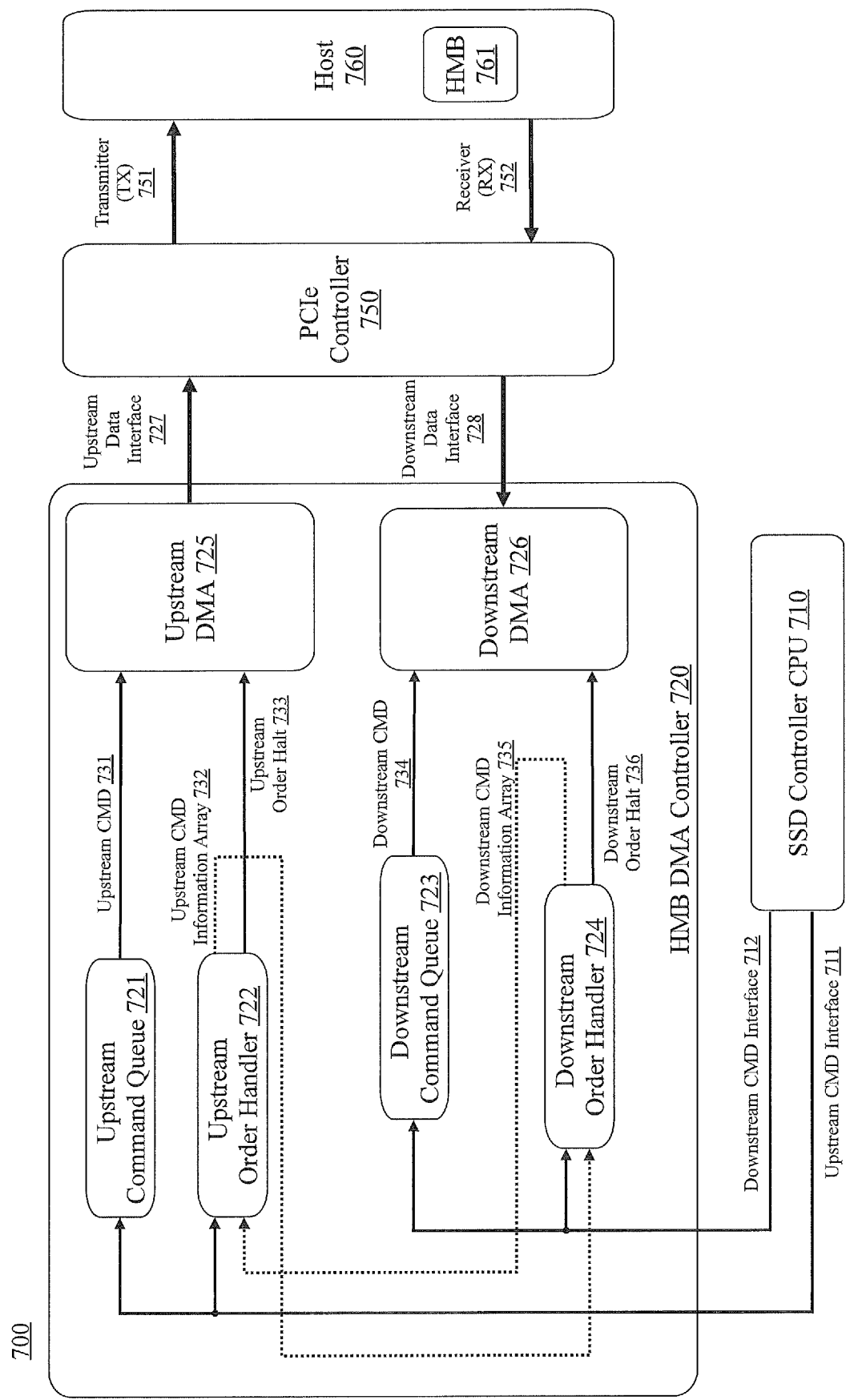
FIG. 7 is a block diagram illustrating controllers within a computer system including a data storage device in accordance with some embodiments of the present disclosure.

FIG. 7 is a block diagram illustrating controllers within a computer system 700 including a data storage device in accordance with some embodiments of the present disclosure. FIG. 7 may illustrate functional blocks of a computer system 700 including a data storage device. The data storage device may include the solid-state drive (SSD) controller CPU 710 and the host memory buffer (HMB) direct memory access (DMA) controller 720. The data storage device may include the SSD controller CPU 710, the HMB DMA controller 720, and the peripheral component interconnect express (PCIe) controller 750. The SSD controller CPU 710 and the HMB DMA controller 720 may be implemented by a controller of a data storage device (e.g., the controller 131 or the processor 220). The SSD controller CPU 710, the HMB DMA controller 720, and the PCIe controller 750 may be implemented by a controller of a data storage device (e.g., the controller 131 or the processor 220).

The SSD controller CPU 710 may transmit signals of upstream commands through the upstream command (CMD) interface 711. The signals of upstream commands from the SSD controller CPU 710 may be transmitted to the HMB DMA controller 720. The signals of upstream commands from the SSD controller CPU 710 may be transmitted to the upstream command queue 721 and the upstream order handler 722. The upstream command queue 721 may have functions similar to those of upstream queue 320a. The upstream order handler 722 may have functions to maintain an upstream command information array 732 and may have functions to record information of upstream commands in the upstream command information array 732. The upstream command information array 732 may be similar to the upstream command information array 510.

The SSD controller CPU 710 may transmit signals of downstream commands through the downstream command (CMD) interface 712. The signals of downstream commands from the SSD controller CPU 710 may be transmitted to the HMB DMA controller 720. The signals of downstream commands from the SSD controller CPU 710 may be transmitted to the downstream command queue 723 and the downstream order handler 724. The downstream command queue 723 may have functions similar to those of downstream queue 320b. The downstream order handler 724 may have functions to maintain a downstream command information array 734 and may have functions to record information of downstream commands in the downstream command information array 734. The downstream command information array 734 may be similar to the downstream command information array 520.

One or more upstream commands (CMD) 731 may be popped from the upstream command queue 721 in sequence. The upstream command 731 popped from the upstream queue 721 may be transmitted to the upstream DMA 725. The upstream command 731 may be executed and processed by the upstream DMA 725.

The upstream order handler 722 may maintain and update the upstream command information array 732 based on the upstream commands received through the upstream command interface 711 and the downstream command information array 735. For example, the upstream order handler 722 may update the order tags of the entries recorded in the upstream command information array 732. The upstream command information array 732 may be maintained and updated through the operations described in the embodiments of FIGS. 5A-5F. The updated upstream command information array 732 may be transmitted to the downstream order handler 724 to maintain and update the downstream command information array 735.

The upstream order handler 722 may transmit an upstream order halt 733 to the upstream DMA 725. The upstream order halt 733 may be transmitted because the execution or processing of the upstream command in the upstream DMA 725 should be halted. For example, if the upstream command in the upstream DMA 725 must be executed or processed until a specific downstream command has been executed or processed, the upstream order halt 733 may be transmitted to halt the execution or processing of the upstream command in the upstream DMA 725. Whether the upstream order halt 733 is transmitted may be determined through comparisons between the order tag of the upstream command in the upstream DMA 725 with the serial numbers recorded in the downstream command information array 735. Whether the upstream order halt 733 is transmitted may be determined through the operations described in the embodiments of FIGS. 6A-6C.

One or more downstream commands (CMD) 734 may be popped from the downstream command queue 723 in sequence. The downstream command 733 popped from the downstream queue 723 may be transmitted to the downstream DMA 726. The downstream command 734 may be executed and processed by the downstream DMA 726.

The downstream order handler 724 may maintain and update the downstream command information array 735 based on the downstream commands received through the downstream command interface 712 and the upstream command information array 732. For example, the downstream order handler 724 may update the order tags of the entries recorded in the downstream command information array 735. The downstream command information array 735 may be maintained and updated through the operations described in the embodiments of FIGS. 5A-5F. The updated downstream command information array 735 may be transmitted to the upstream order handler 722 to maintain and update the upstream command information array 732.

The downstream order handler 724 may transmit a downstream order halt 736 to the downstream DMA 726. The downstream order halt 736 may be transmitted because the execution or processing of the downstream command in the downstream DMA 726 should be halted. For example, if the downstream command in the downstream DMA 726 must be executed or processed until a specific upstream command has been executed or processed, the downstream order halt 736 may be transmitted to halt the execution or processing of the downstream command in the downstream DMA 726. Whether the downstream order halt 736 is transmitted may be determined through comparisons between the order tag of the downstream command in the downstream DMA 726 and the serial numbers recorded in the upstream command information array 732. Whether the downstream order halt 736 is transmitted may be determined through the operations described in the embodiments of FIGS. 6A-6C.

After the upstream command in the upstream DMA 725 is executed or processed, the corresponding command and data may be transmitted to the PCIe controller 750. The corresponding command may be transmitted to the PCIe controller 750 through a signaling interface, and the corresponding data block may be transmitted to the PCIe controller 750 through the upstream data interface 727. In some embodiments, after the upstream command in the upstream DMA 725 is executed or processed, the corresponding command and data block may be transmitted to a corresponding interface controller when the data storage device (including the SSD controller CPU 710 and HMB DMA controller 720) is connected to the host 760 with any communication protocols using at least one of the standards associated with the Universal Serial Bus (USB), Advanced Technology Attachment (ATA), serial ATA (SATA), Small Computer Small Interface (SCSI), serial attached SCSI (SAS), parallel ATA (PATA), High Speed Inter-Chip (HSIC), Firewire, Peripheral Component Interconnection (PCI), Nonvolatile Memory Express (NVMe), Universal Flash Storage (UFS), Secure Digital (SD), Multi-Media Card (MMC), embedded MMC (eMMC).

The PCIe controller 750 may transmit a corresponding command and data block for the upstream operation to the host 760. The corresponding command may be transmitted to the host 760 through a signaling interface, and the corresponding data block may be transmitted to the host 760 through the transmitter 751. Upon receiving the corresponding command and data block for the upstream operation, the host 760 may write corresponding data block at designated addresses of the HMB 761. In some embodiments, the corresponding data block for the upstream operation transmitted to the host 760 may be directly write at designated addresses of the HMB 761 through a bus within the host 760.

After the downstream command in the downstream DMA 726 is executed or processed, the corresponding command may be transmitted to the PCIe controller 750, and the corresponding data block may be received from the PCIe controller 750. The corresponding command may be transmitted to the PCIe controller 750 through a signaling interface, and the corresponding data block may be received from the PCIe controller 750 through the downstream data interface 728. In some embodiments, after the downstream command in the downstream DMA 726 is executed or processed, the corresponding command may be transmitted to a corresponding interface controller when the data storage device (including the SSD controller CPU 710 and HMB DMA controller 720) is connected to the host 760 with any communication protocols using at least one of the standards associated with the Universal Serial Bus (USB), Advanced Technology Attachment (ATA), serial ATA (SATA), Small Computer Small Interface (SCSI), serial attached SCSI (SAS), parallel ATA (PATA), High Speed Inter-Chip (HSIC), Firewire, Peripheral Component Interconnection (PCI), Nonvolatile Memory Express (NVMe), Universal Flash Storage (UFS), Secure Digital (SD), Multi-Media Card (MMC), embedded MMC (eMMC), and the corresponding data block may be received from the corresponding interface controller.

The PCIe controller 750 may transmit a corresponding command for the downstream operation to the host 760. The PCIe controller 750 may receive corresponding data for the downstream operation from the host 760. The corresponding command may be transmitted to the host 760 through a signaling interface, and the corresponding data block may be received from the host 760 through the receiver 752. Upon receiving the corresponding command for the downstream operation, the host 760 may read corresponding data at designated addresses of the HMB 761 and transmit the corresponding data block to the PCIe controller 750. In some embodiments, the corresponding data block for the downstream operation transmitted to the PCIe controller 750 may be directly read at designated addresses of the HMB 761 through a bus within the host 760.

Figure 8:
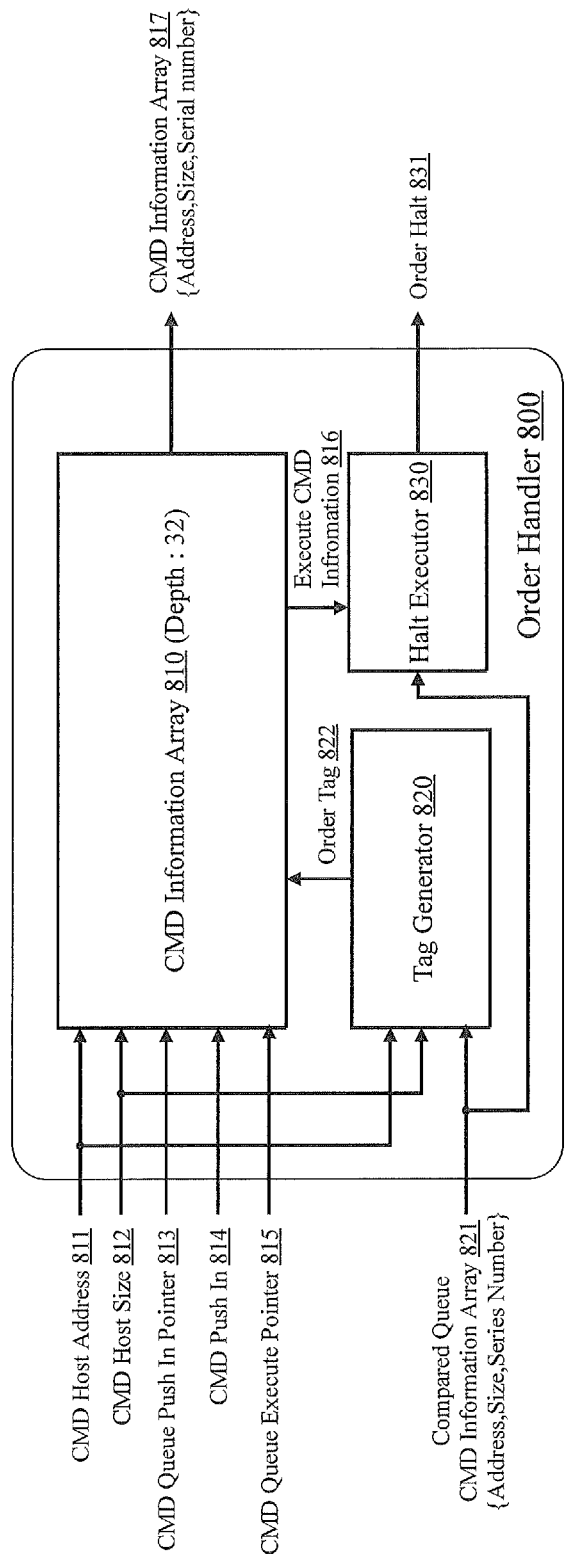
FIG. 8 is a block diagram illustrating an order handler in accordance with some embodiments of the present disclosure.

FIG. 8 is a block diagram illustrating an order handler 800 in accordance with some embodiments of the present disclosure. FIG. 8 may illustrate functional blocks of an order handler 800. The upstream order handler 721 and/or the downstream order handler 724 may be implemented using the order handler 800. The order handler 800 may be implemented by a controller of a data storage device (e.g., the controller 131 or the processor 220).

The inputs of the order handler 800 may include a command host address 811, a command host size 812, a command queue push in pointer 813, a command push in 814, and a command queue execute pointer 815. These inputs may be received from the SSD controller CPU 710. The command host address 811 may indicate the address to be written or read of the HMB within the host. The command host size 812 may indicate the data size to be written or read. The command queue push in pointer 813 may indicate the position in which the next command may be pushed. The command push in 814 may indicate the command to be pushed in. The command queue execute pointer 815 may indicate the command in the queue to be executed.

The inputs of the order handler 800 may include a compared queue command information array 821. The compared queue command information array 821 may include the addresses to be written or read according to commands, the data sizes to be written or read according to the commands, and the serial numbers of the commands. When the order handler 800 functions as the upstream order handler 722, the compared queue command information array 821 may be a downstream command information array 735 or a downstream command information array 520. When the order handler 800 functions as the downstream order handler 724, the compared queue command information array 821 may be an upstream command information array 732 or an upstream command information array 510.

The order handler 800 may include a command information array 810, a tag generator 820, and a halt executor 830. A command host address 811, a command host size 812, a command queue push in pointer 813, a command push in 814, a command queue execute pointer 815, and an order tag 822 may be input to the command information array 810. The command information array 810 may generate and output a command information array 817. When the order handler 800 functions as the upstream order handler 722, the command information array 817 may be an upstream command information array 732 or an upstream command information array 510. When the order handler 800 functions as the downstream order handler 724, the command information array 817 may be a downstream command information array 735 or a downstream command information array 520. The command information array 817 may be generated and updated through the operations described in embodiments of FIGS. 5A-5F.

A command host address 811, a command host size 812, and a compared queue command information array 821 may be input to the tag generator 820. The tag generator 820 may generate and output an order tag 822. The order tag 822 may be generated through the operations described in the embodiments of FIGS. 5A-5F.

The inputs of the halt executor 830 may include an execute command information 816 and a compared command information array 821. The execute command information 816 may include the information of the command to be executed, including the address to be written or read according to the command to be executed, the data size to be written or read according to the command to be executed, the serial number of the command to be executed, and the order tag of the command to be executed. The halt executor 830 may generate and output an order halt 831. The order halt 831 may be used to halt the execution or processing of the command to be executed. When the order handler 800 functions as the upstream order handler 722, the order halt 831 may be an upstream order halt 733. When the order handler 800 functions as the downstream order handler 724, the order halt 831 may be a downstream order halt 736. The order halt 831 may be generated through the operations described in the embodiments of FIGS. 6A-6C.

FIG. 9 is a flow chart illustrating a method 900 of operating a data storage device in accordance with some embodiments of the present disclosure. The method 900 described in FIG. 9 may be performed by the SSD controller CPU 710, the HMB DMA controller 720, the controller 131, and/or the processor 220.

In operation 901, a first command may be stored in a first command queue. In operation 903, a second command may be stored in a second command queue. The first and second commands may be received from a processor. The processor may be the SSD controller CPU 710, and the corresponding operations may be performed by the HMB DMA controller 720. The first and second command queues may be maintained in the HMB DMA controller 720.

When the first command is an upstream command, the second command may be a downstream command. When the first command is an upstream command, the first queue may be the upstream command queue 721 or the upstream queue 320*a*. When the second command is a downstream command, the second queue may be the downstream command queue 723 or the downstream queue 320*b*. When the first command is a downstream command, the second command may be an upstream command. When the first command is a downstream command, the first queue may be the downstream command queue 723 or the downstream queue 320*b*. When the second command is an upstream command, the second queue may be the upstream command queue 721 or the upstream queue 320*a*.

The first command may be associated with a first serial number. The first serial number may indicate order of first information associated with the first command to be transmitted to an interface controller. The second command may be associated with a second serial number. The second serial number may indicate order of second information associated with the second command to be transmitted to the interface controller. In some embodiments, the interface controller may be the PCIe controller 750 or an interface controller supporting the interface for connecting the data storage device.

In operation 905, in response to a first access region of the first command overlapping a second access region of the second command in the second queue, an order tag for the second command may be assigned based on the first serial number of the first command. The order tag may be assigned or generated by a tag generator (e.g., the tag generator 820).

In some embodiments, in response to the order tag of the second command indicating that the second command should be transmitted earlier than information associated with all commands in the first command queue, the second information associated with the second command may be transmitted to the interface controller. For example, when the order tag of the first command at the front of the first queue is equal to the serial number of the second command in the second queue, it may be determined that the second command can be executed earlier than the command in the first queue, and the second information associated with the second command may be transmitted to the interface controller earlier than information associated with all commands in the first command queue.

In some embodiments, in response to the first access region of the first command overlapping the second access region of the second command in the second queue, the tag generator may assign the order tag to the second command equal to the first serial number of the first command.

In some embodiments, in response to each command in the first command queue having a serial number greater than the order tag of the second command, the second information associated with the second command may be transmitted to the interface controller.

In some embodiments, in response to each command in the first command queue having a serial number smaller than the order tag of the second command, the second information associated with the second command may be transmitted to the interface controller.

In some embodiments, in response to the serial number of each command in the first command queue not being equal to the order tag of the second command, the second information associated with the second command may be transmitted to the interface controller.

In some embodiments, the first access region of the first command may be defined by a first memory address and a first data size included in the first command. The second access region of the second command may be defined by a second memory address and a second data size included in the second command. The first and second commands may include direct memory access commands of the storage device.

It should be noted that the above disclosure is for illustrative purposes and should not be deemed as limiting the present disclosure. Those skilled in the art will readily observe that numerous modifications and alterations of the device and method may be made while retaining the teachings of the present disclosure. Accordingly, the above disclosure should be construed as limited only by the metes and bounds of the appended claims.

What is claimed is:

1. A controller of a storage device, comprising:
an interface controller;
a memory controller;
a processor configured to transmit downstream commands and upstream commands to the memory controller;
the memory controller coupled between the interface controller and the processor and comprising:
a first command queue;
a second command queue; and
a tag generator,
wherein the memory controller is configured to:
store a first command received from the processor in the first command queue, wherein the first command is associated with a first serial number, which indicates order of first information associated with the first command to be transmitted to the interface controller;
store a second command received from the processor in the second command queue, wherein the second command is associated with a second serial number, which indicates order of second information associated with the second command to be transmitted to the interface controller;
in response to a first access region of the first command overlapping a second access region of the second command in the second command queue, assign an order tag to the second command based on the first serial number of the first command by the tag generator; and
transmit the second information associated with the second command to the interface controller in response to the order tag of the second command indicating that the second command should be transmitted earlier than information associated with all commands in the first command queue.

2. The controller of claim 1, wherein in response to the first access region of the first command overlapping the second access region of the second command in the second command queue, the tag generator assigns the order tag to the second command that is equal to the first serial number of the first command.

3. The controller of claim 2, wherein the memory controller is further configured to:
transmit the second information associated with the second command to the interface controller in response to each command in the first command queue having a serial number smaller than the order tag of the second command.

4. The controller of claim 2, wherein the memory controller is further configured to:
transmit the second information associated with the second command to the interface controller in response to each command in the first command queue having a serial number smaller than the order tag of the second command.

5. The controller of claim 1, wherein the first command queue includes an upstream command queue and the second command queue includes a downstream command queue.

6. The controller of claim 1, wherein the first command queue includes a downstream command queue and the second command queue includes an upstream command queue.

7. The controller of claim 1, wherein the first access region of the first command is defined by a first memory address and a first data size included in the first command, and the second access region of the second command is defined by a second memory address and a second data size included in the second command.

8. The controller of claim 1, wherein the first and second commands include direct memory access commands of the storage device.

9. The controller of claim 1, wherein the interface controller is a peripheral component interconnect express (PCIe) interface controller.

10. A storage device including the controller of claim 1.

11. A method performed by a storage device for accessing a memory of a host, comprising:
storing a first command in a first command queue, wherein the first command is associated with a first serial number, which indicates order of first information associated with the first command to be transmitted to the host;
storing a second command in a second command queue, wherein the second command is associated with a second serial number, which indicates an order of second information associated with the second command to be transmitted to the host;
in response to a first access region of the first command overlapping a second access region of the second command in the second command queue, assigning an order tag to the second command based on the first serial number of the first command, wherein the first access region and the second access region relate to areas in the memory of the host; and
transmitting the second information associated with the second command to the host in response to the order tag of the second command indicating that the second information associated with the second command should be transmitted earlier than information associated with all commands in the first command queue.

12. The method of claim 11, wherein in response to the first access region of the first command overlapping the second access region of the second command in the second command queue, assigning the order tag to the second command that is equal to the first serial number of the first command.

13. The method of claim 12, further comprising:
transmitting the second information associated with the second command to the host in response to each command in the first command queue having a serial number greater than the order tag of the second command.

14. The method of claim 12, further comprising:
transmitting the second information associated with the second command to the host in response to each command in the first command queue having a serial number smaller than the order tag of the second command.

15. The method of claim 11, wherein the first command queue includes an upstream command queue and the second command queue includes a downstream command queue.

16. The method of claim 11, wherein the first command queue includes a downstream command queue and the second command queue includes an upstream command queue.

17. The method of claim 11, wherein the first access region of the first command is defined by a first memory address and a first data size included in the first command, and the second access region of the second command is defined by a second memory address and a second data size included in the second command.

18. The method of claim 11, wherein the first and second commands include direct memory access commands of the storage device.

19. The method of claim 11, wherein the host and the storage device are connected through a peripheral component interconnect express (PCIe) interface.

* * * * *